Sept. 14, 1954  M. M. DEAN ET AL  2,689,013
CONTROL FOR TWO-ENGINE VEHICLES
Filed March 28, 1947  12 Sheets-Sheet 1
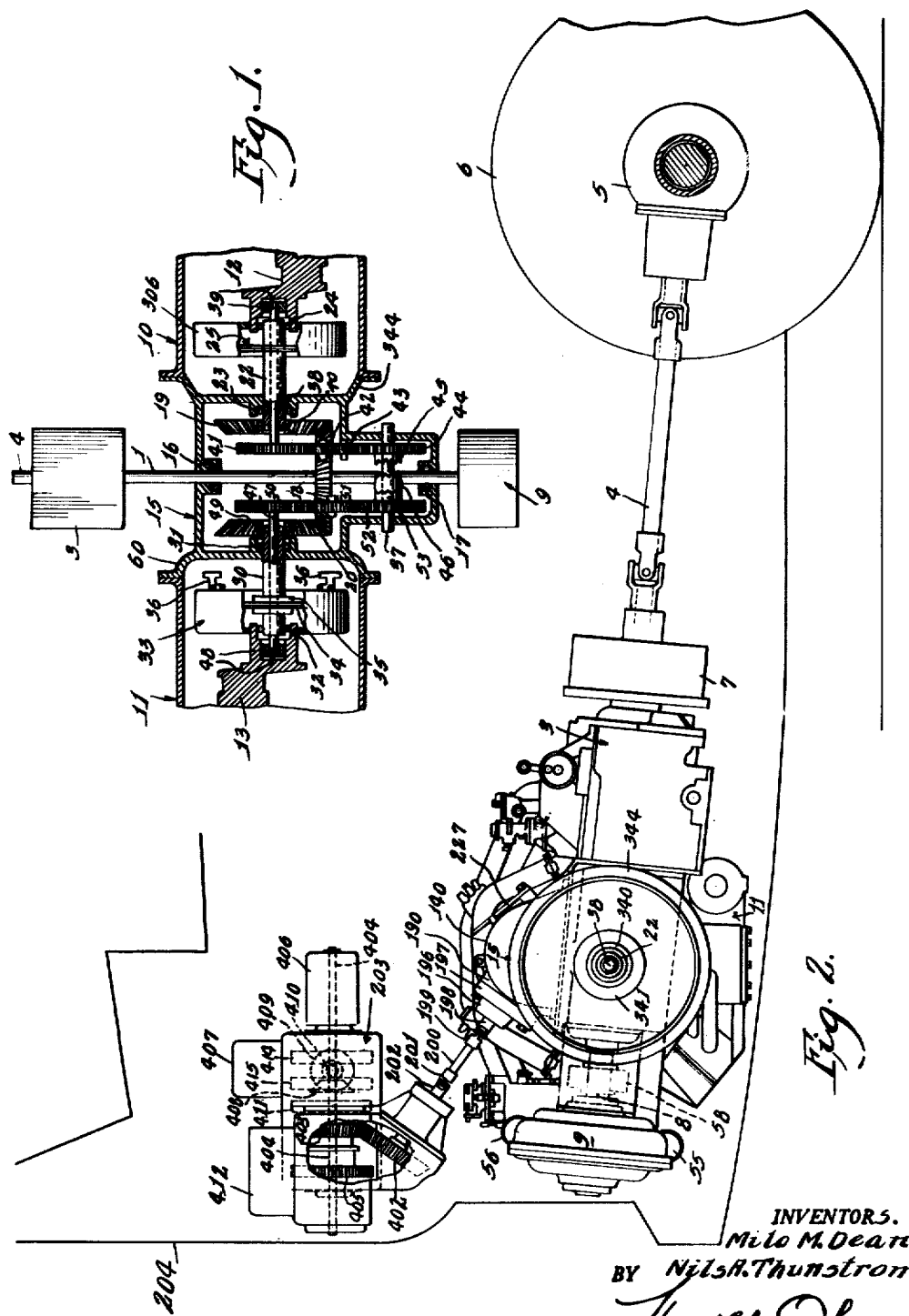
INVENTORS.
Milo M. Dean.
BY Nils A. Thunstrom.
Harold Olsen
Attorney.

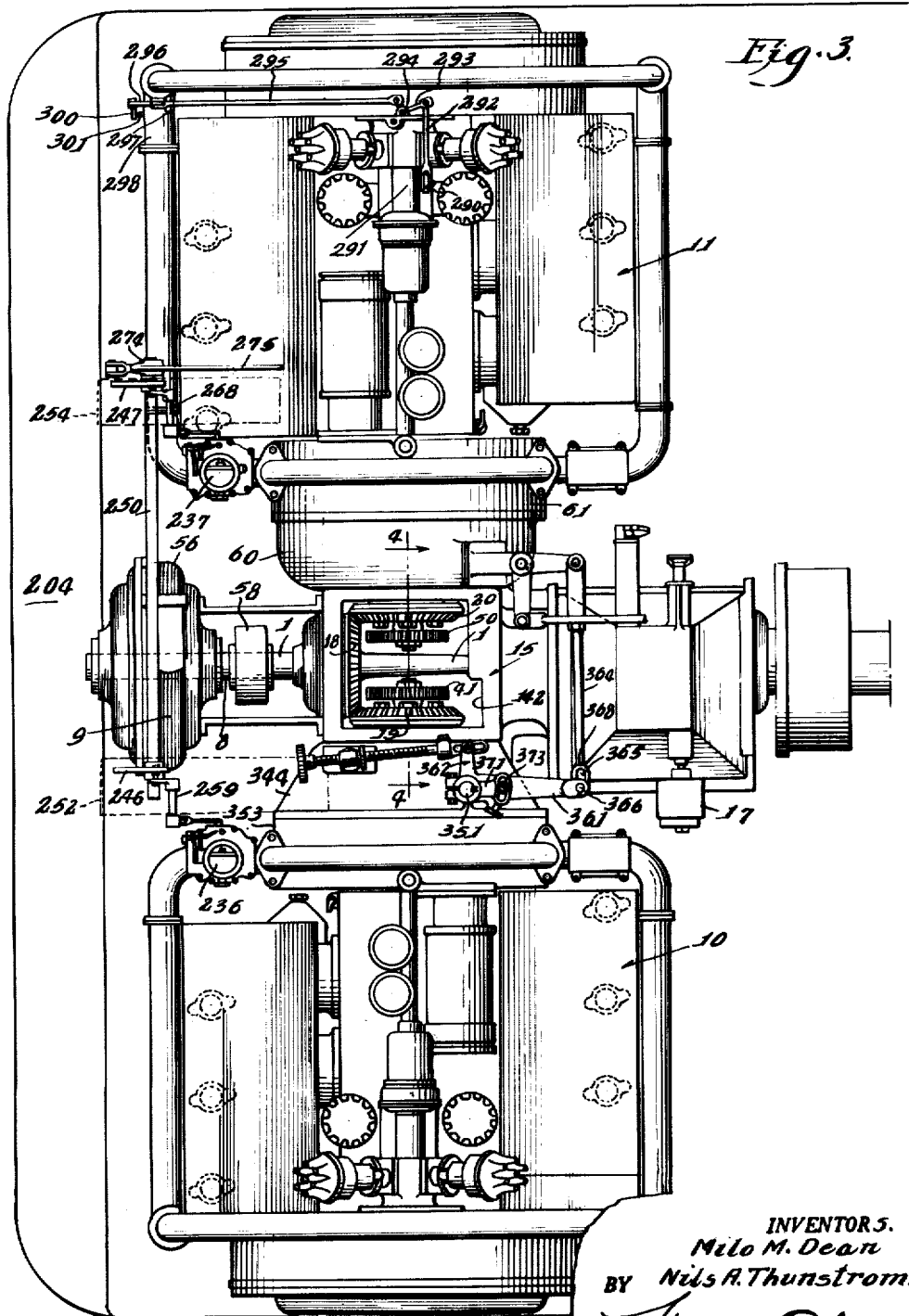

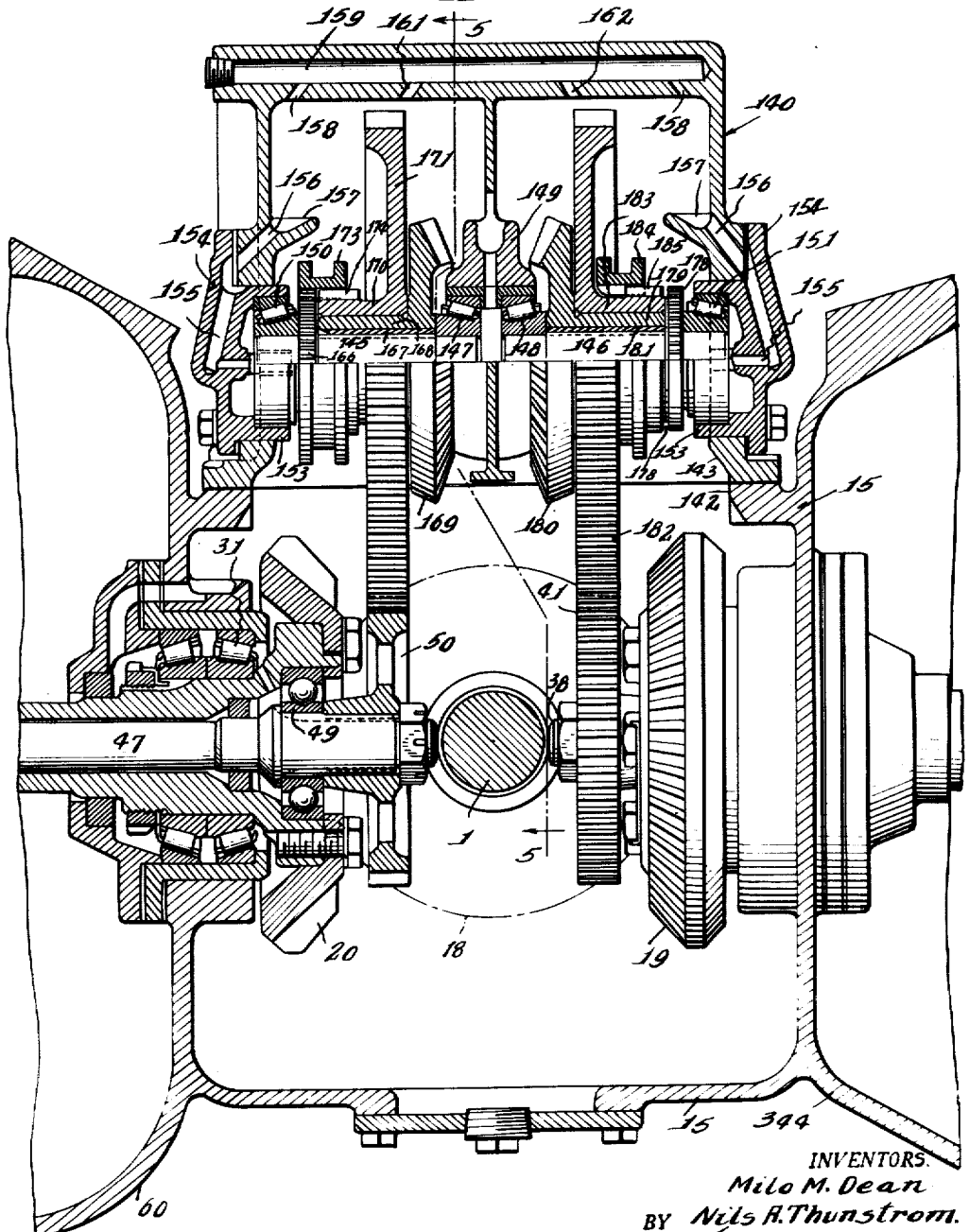

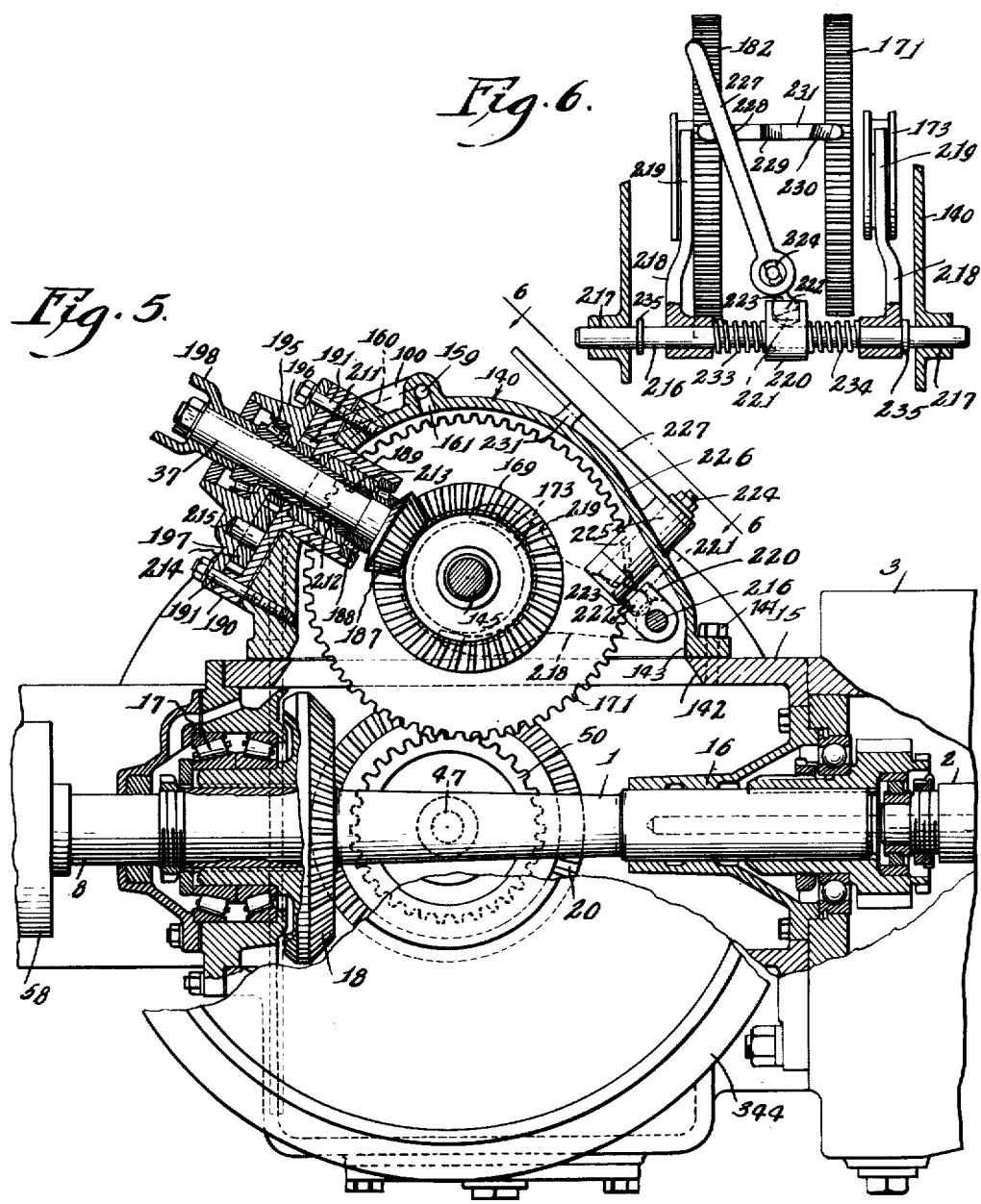

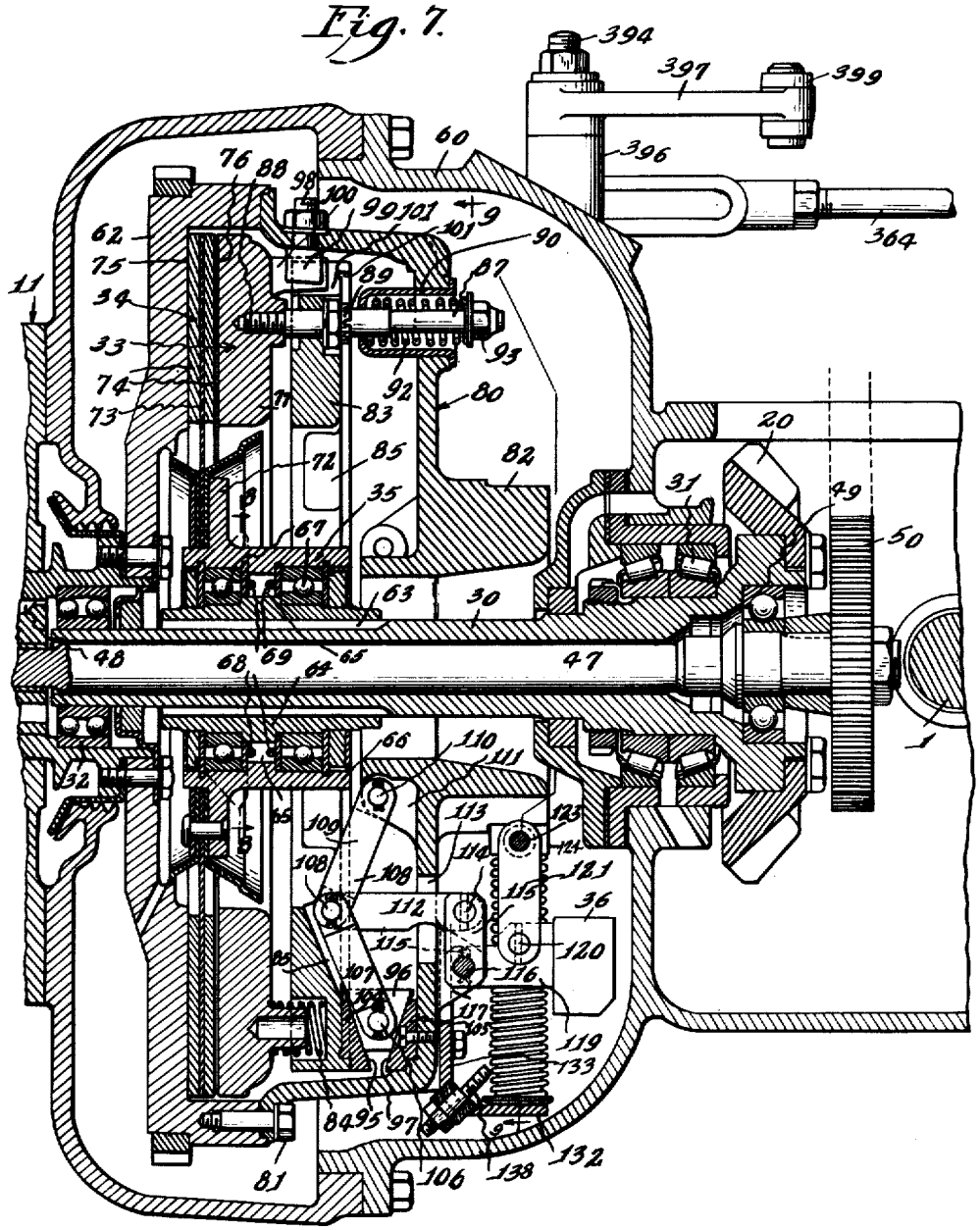

Sept. 14, 1954     M. M. DEAN ET AL     2,689,013
CONTROL FOR TWO-ENGINE VEHICLES
Filed March 28, 1947     12 Sheets-Sheet 6
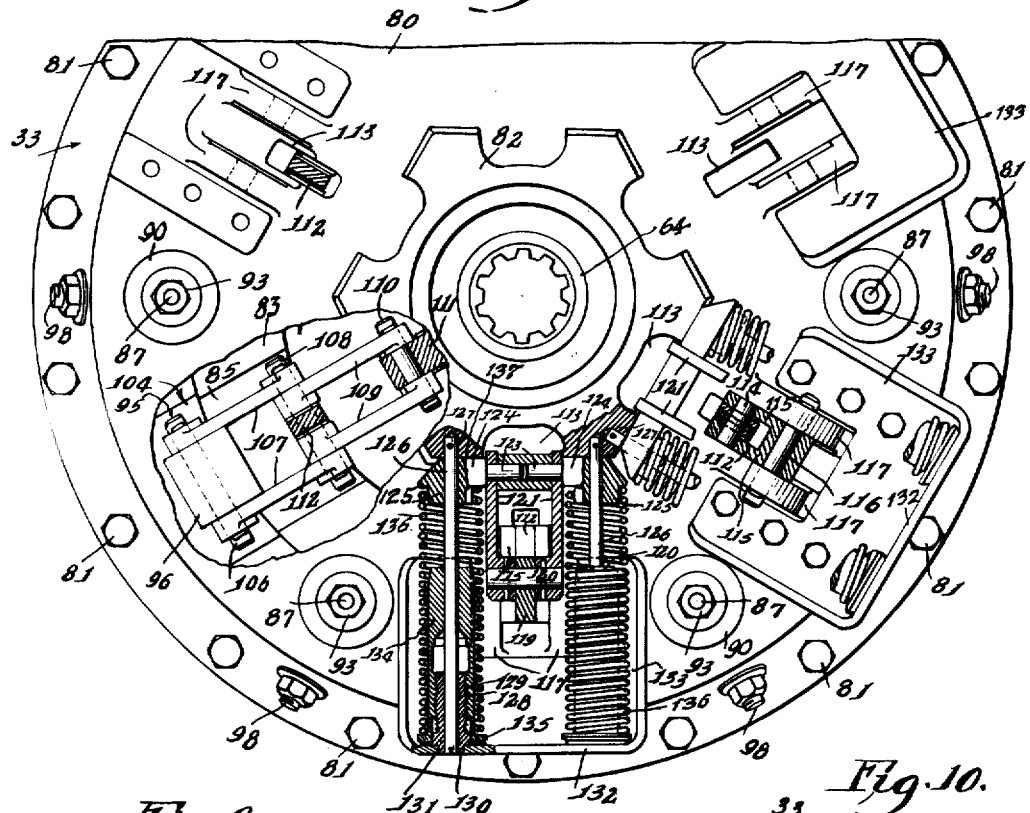
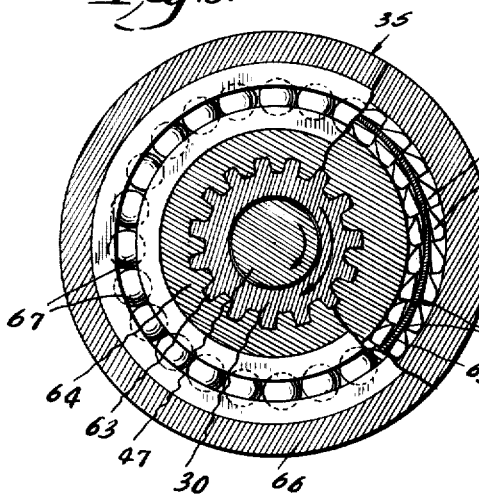
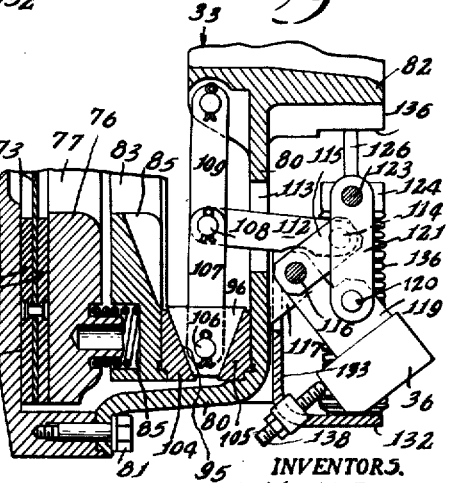
INVENTORS.
Milo M. Dean.
BY Nils A. Thunstrom.
Harold Olsen
Attorney.

Sept. 14, 1954 M. M. DEAN ET AL 2,689,013
CONTROL FOR TWO-ENGINE VEHICLES
Filed March 28, 1947 12 Sheets-Sheet 7

INVENTORS.
Milo M. Dean.
BY Nils R. Thunstrom.
Harold Olsen
Attorney.

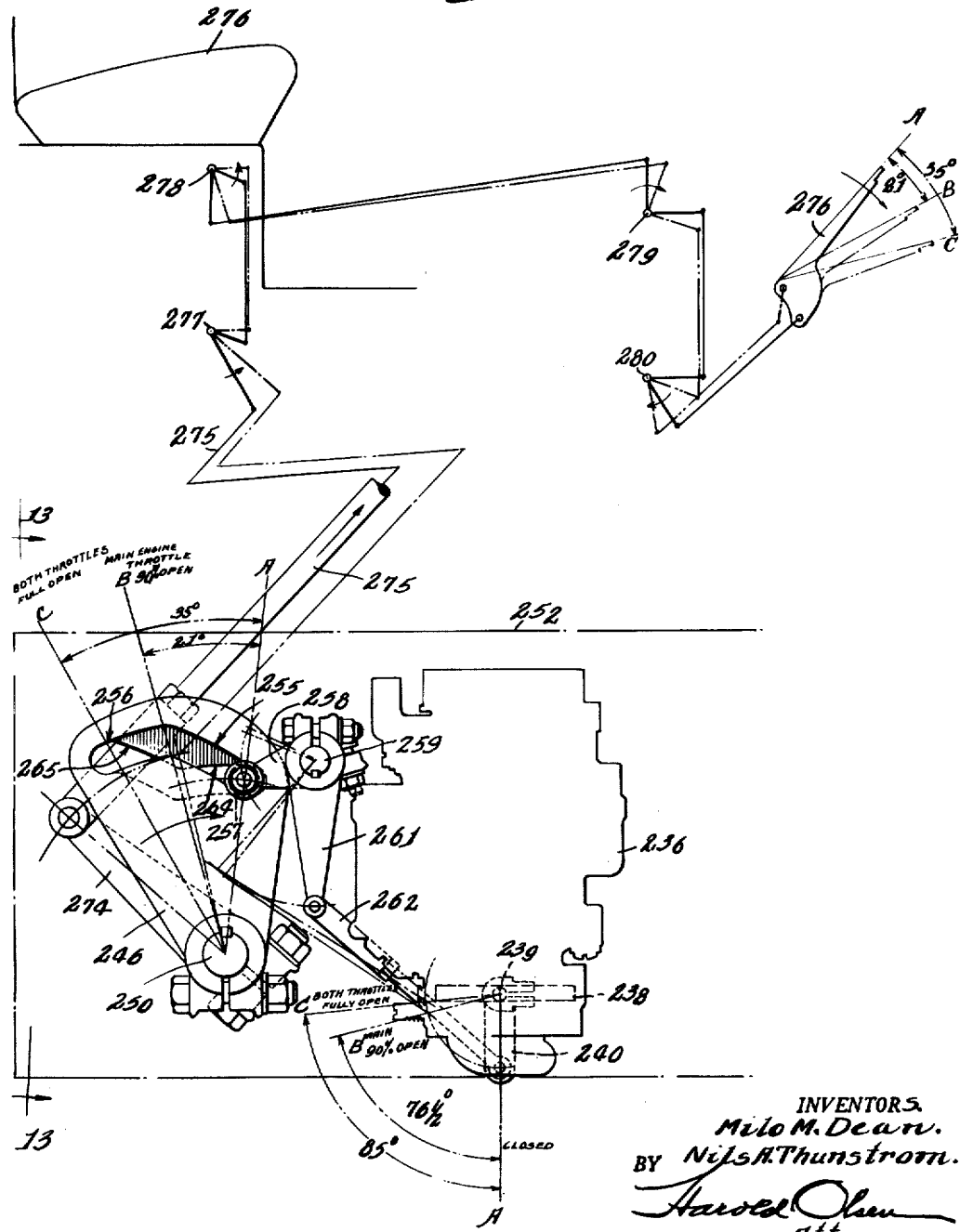

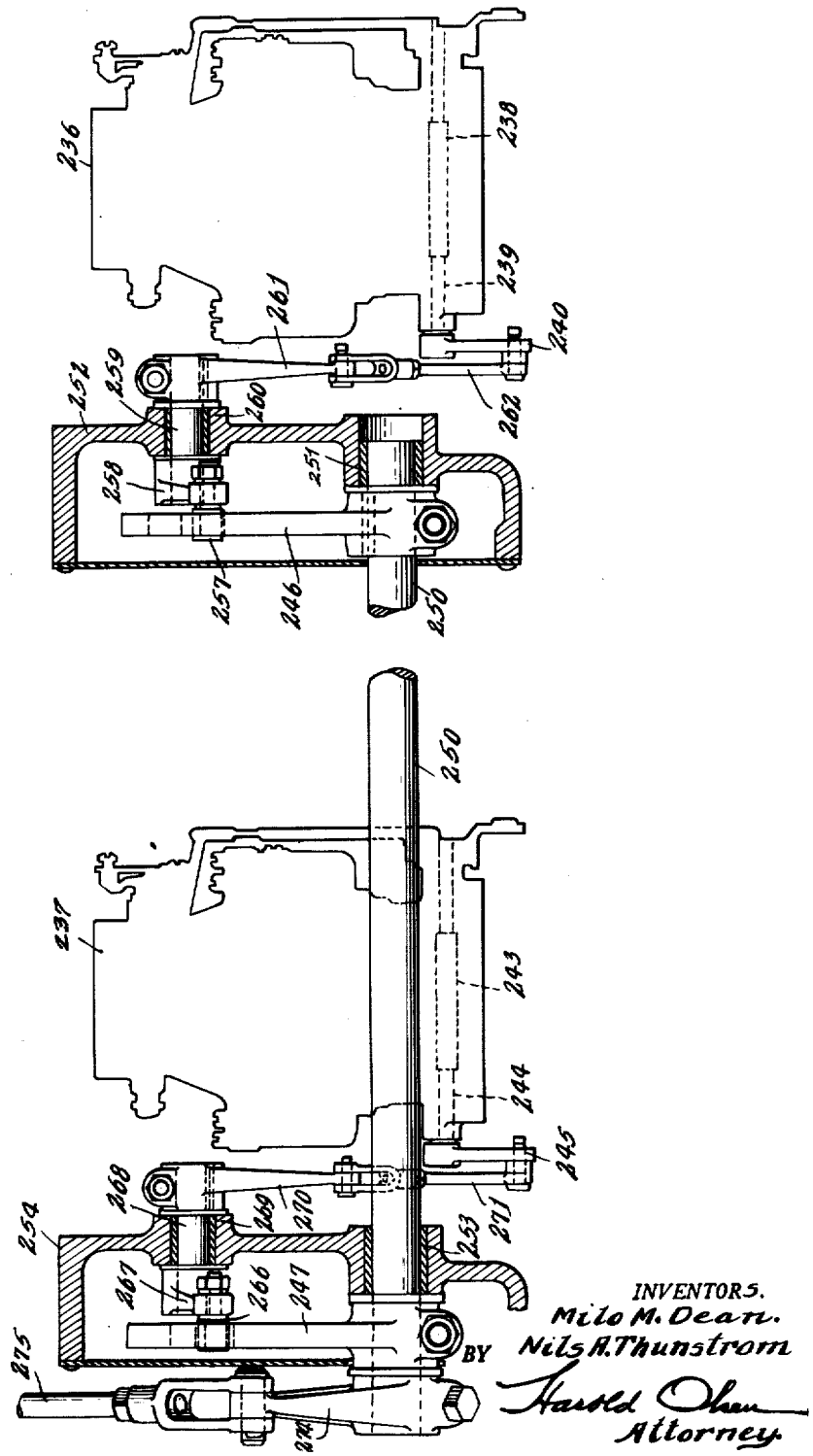

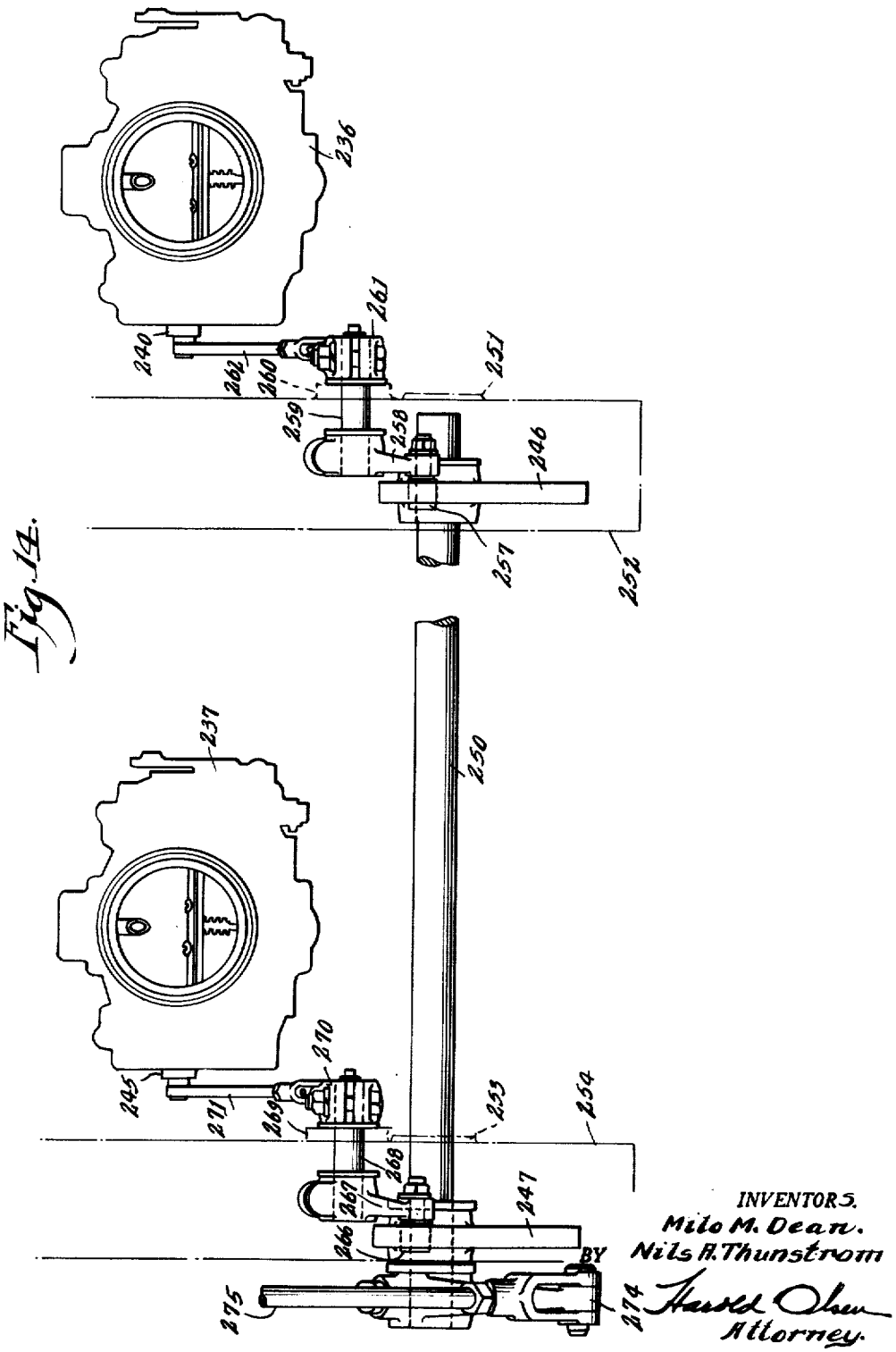

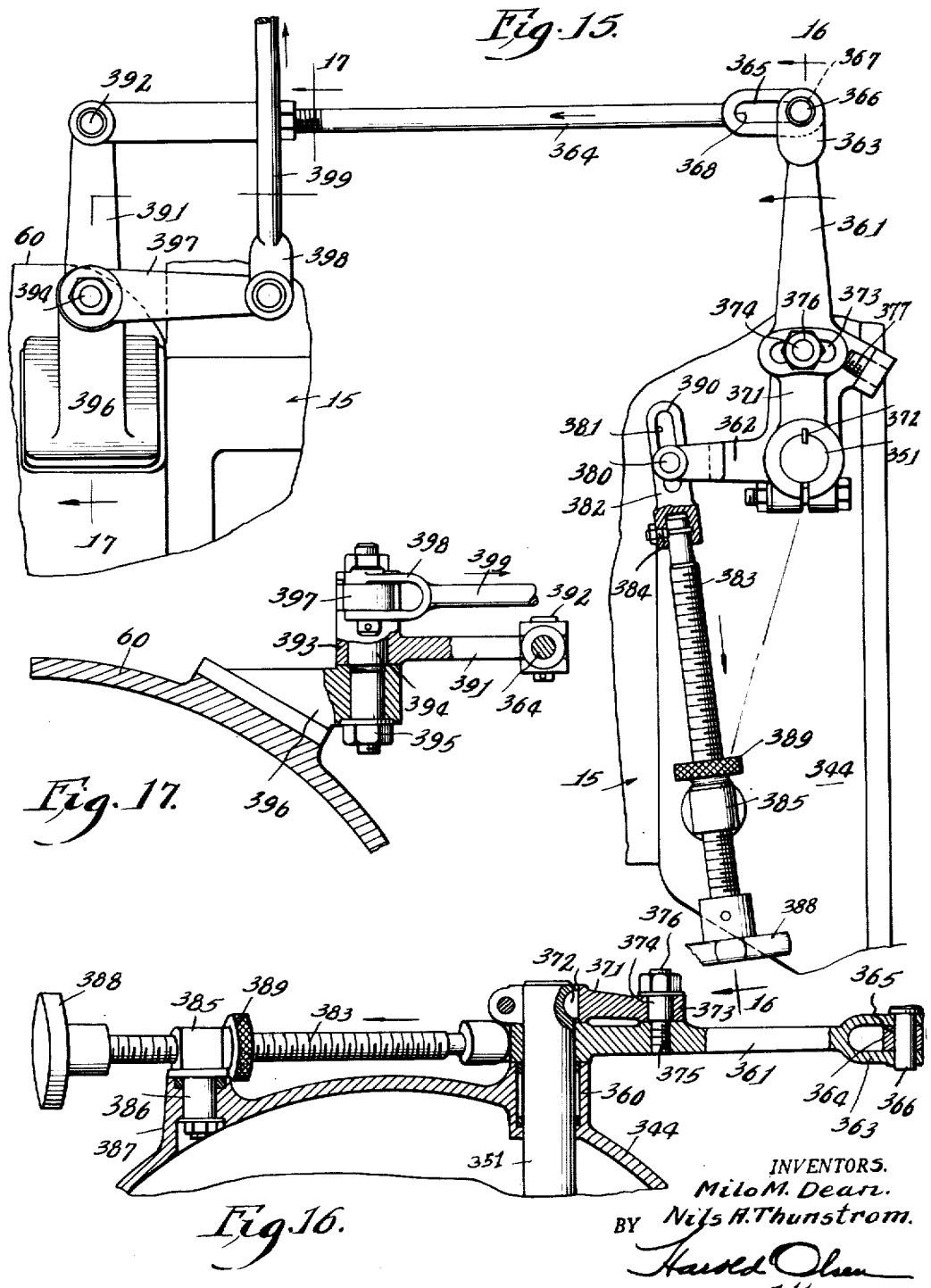

Sept. 14, 1954  M. M. DEAN ET AL  2,689,013
CONTROL FOR TWO-ENGINE VEHICLES
Filed March 28, 1947  12 Sheets-Sheet 12
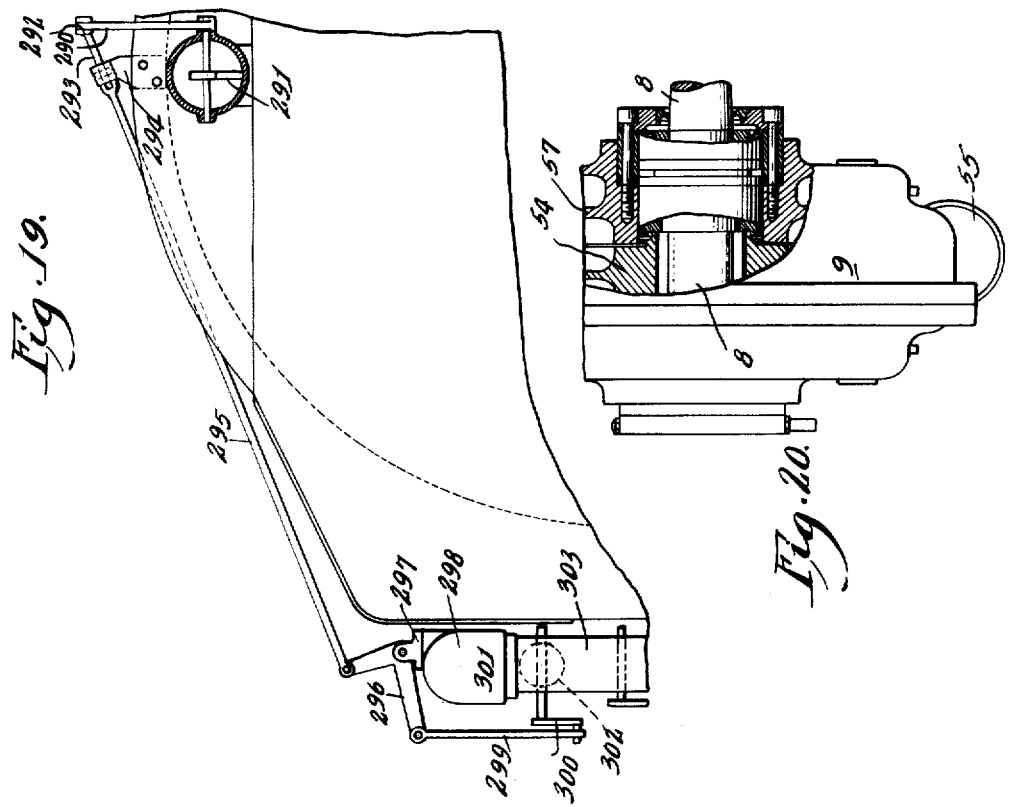
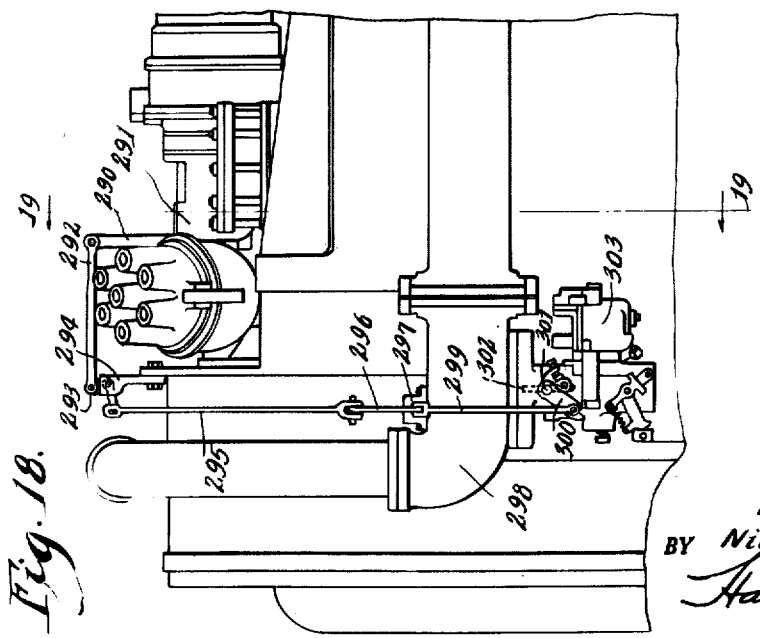
INVENTORS.
Milo M. Dean.
BY Nils A. Thunstrom.
Harold Olsen
Attorney.

Patented Sept. 14, 1954

2,689,013

UNITED STATES PATENT OFFICE 2,689,013

CONTROL FOR TWO-ENGINE VEHICLES

Milo M. Dean, Palatine, and Nils A. Thunstrom, Chicago, Ill., assignors to The Greyhound Corporation, Chicago, Ill., a corporation of Delaware Application March 28, 1947, Serial No. 737,976

30 Claims. (Cl. 180—53)

This invention relates to improvements in power applications in the automotive vehicle field. The invention also relates to improvements in methods of engine control. The invention further relates to improvements in power plant structures as well as in structures by which to control said power plant structures. At present the invention finds its most valuable application in the use of two engines and their control for driving an automotive vehicle. The invention has for a special object to provide a power plant, and method and means for control thereof for operating a bus and its accessories, very efficiently and economically. A particular object is to drive the accessories at or near their most economical speeds, irrespective of greatly varying vehicle speeds.

Another object of the invention is to provide means by which two engines may simultaneously power a vehicle, with said means so operable that when one of the engines, herein sometimes called the first or main engine, is operating at any speed to power the vehicle, power from the other or second engine can be automatically transmitted to assist the first engine. Another object is to provide means which automatically prevents the vehicle or the first engine from driving the second engine. Another object is to obtain smooth, synchronized transmission of additional power by one engine to the wheel-driving shaft, while that shaft is being driven by another engine. Another object is to obtain smooth transmission of power for vehicle drive under all the varying speed and load conditions which are met with in operation of automotive vehicles, particularly buses. Another object is to provide auxiliary engine controlled means acting through an overrunning clutch to cause the overrunning clutch to automatically transmit power to the wheel-driving shaft when auxiliary engine speed rises to some predetermined speed. Another object is to provide means by which power from an auxiliary engine can be transmitted for driving the vehicle just as soon as, but only when, auxiliary engine speed rate has risen to (or overtaken) speed rate of a main engine, while said main engine is driving the vehicle. Another object is to provide means to allow the auxiliary engine to be used, to alone propel the vehicle, when the main engine is inoperative.

In order to better understand how the present invention has solved some of the problems incident to bus operation, it will be helpful to discuss the present practice, and to compare that practice with the practice proposed herein, regarding the arrangements of the power plants and the methods of controlling them for driving a vehicle, or for driving a vehicle and the accessories.

Bus operation presents special problems, operating as they do over all sorts of roads and under all sorts of weather and road conditions. The solution of such problems presents special difficulties in relation to limitations of space, weight, weight distribution, and fuel economy.

In view of the increasing demand for more power for propelling buses and their accessories, it has heretofore been found necessary to provide single engines of greater and greater horsepower. Such engines are special, are expensive to buy and to maintain, and are heavy and difficult to handle, either for original assembly or for disassembly.

When one large all-purpose engine is used, to drive the bus and the accessories and if the engine fails, the bus is stalled and of course the accessories are also rendered inoperative, which means that there is no compressed air, light, air-conditioning, heat, etc. Moreover, when a single large engine is used there is low fuel economy when cruising as on level roads, because the engine is operated at an uneconomically low load factor. The greatest fuel economy can be had when an engine is operated at a load factor of about seventy-five to one hundred per cent.

When using a single engine directly driving the accessories, accessory speeds fluctuate with engine speed fluctuations. When the single engine is idling, the accessories may not be driven at their required speed, and poor fuel economy results if fractional throttle operation of the single engine is necessary to obtain and maintain proper accessory speed. In addition, directly connected accessories are subject to engine vibration and this results in engine unbalance and rapid wear of driving elements, such as timing gears, etc. Also, the large engine must be of special make and oversize, and requires a special line of service parts and tools. These large engines are much more expensive than medium-size engines. Moreover, one large engine mounted transversely of the bus behind the rear axle necessitates an angle drive connection between the transmission and the differential, and involves difficult mounting problems. Weight distribution transversely of the vehicle cannot be most advantageously obtained.

Where one large engine is used only for propelling the vehicle and one small engine is used only for driving the accessories, failure of either engine means total stoppage of the vehicle or of the accessories. In this case also the accessories are subjected to engine vibrations and they may cause engine unbalance. Where two different sizes of engines are used, two different lines of service parts and tools are required and the character of each service operation is different.

Now in bus operation even small economies are very important, but the invention herein provides relatively large economies, as will hereinafter appear. We propose to overcome the above objections to the use of one oversize special make all-purpose engine, or to the use of one large engine for vehicle drive only and one small engine for accessory drive only, by providing two medium-size preferably standard-type engines of substantially the same horsepower, and each capable, under favorable conditions of simultaneously driving both the vehicle and the accessories. But we normally use only part of the power of one of the engines to drive the accessories at constant speed and with good fuel economy, and use the other engine only for driving the vehicle under normal or favorable load and road conditions, also with good fuel economy. We also provide means under driver control whereby the surplus power of the accessory-drive engine can at the will of the operator be promptly, automatically and effectively transmitted for assisting the other engine in driving the vehicle. The selective transmission of surplus power is in part, uniquely accomplished herein through a single-throttle pedal during natural forward motion of the pedal. In this respect throttle pedal operation is of a type familiar to all drivers, so that no special thought or unusual act is necessary on the driver's part to cut-in or cut-out the power of the auxiliary engine, for use in vehicle propulsion.

Selective means are further provided whereby if either engine fails the other engine can in an emergency simultaneously drive the vehicle and the accessories. A feature is that none of the accessories are mounted on the engine but have their power elements mounted, all or in part on the same but separate support, which support encloses intermediate accessory drive mechanism, which may include speed-change devices.

With our invention, ordinary cruising can be had at an economical load factor, with resultant good fuel economy. In the preferred form of our invention the auxiliary engine operates at an economically high load factor and therefore with good fuel economy, at relatively low constant speed on an engine governor regulated carburetor for powering the accessories, thus requiring no manual attention except for starting the engine. The same engine is also operated on another manually controlled carburetor for power outputs above that required for driving the accessories, when transmission of its suplus power is needed to assist the main engine in powering the vehicle.

In one phase of our invention accessory speed only varies under emergency conditions, that is, when the auxiliary engine is being accelerated or operated in its higher speed and power range. In another phase of the invention the intermediate accessory drive mechanism, above mentioned, can automatically operate to substantially prevent undue speed accelerations of the accessories when the auxiliary engine is speeded up.

By the use of an engine governor-regulated carburetor on the auxiliary engine, accessory speed is automatically kept substantially constant. We provide for the manual interruption of transmission of power to the accessories on failure of the accessories per se, and also provide for driving the accessories by means of the main engine in case of failure of the auxiliary engine.

The usual manual means are herein provided for controlling the main engine clutch, and additional means, associated with the manual control means, is provided for locking the main engine clutch in open position in case of main engine failure. In case of such failure surplus power of the auxiliary engine can be transmitted for driving the vehicle, while at the same time this engine can drive the accessories.

By the use of two duplicate medium-size engines the same can be mounted symmetrically, one at each opposite side of the longitudinal center line of the bus so that straight drive to the transmission and differential is possible, and so that power plant weight is symmetrically distributed in relation to said longitudinal center line of the vehicle. The line of service parts and tools are identical for both engines and each service operation is of the same character. The smaller, lighter engine units are easier to assemble and disassemble, and the smaller engines and their parts are more readily available, and they are cheaper.

There are several structures herein which may per se be considered to constitute distinct phases of this invention, usable in various combinations and subcombinations, and among these phases are: The use of automatic means, such as a centrifugal or equivalent clutch on one of two engines for automatically power-connecting that engine to drive a common shaft driven by the other engine, only when the engine speed exceeds some predetermined minimum; the driving of a common shaft by one or two engines separately or by both simultaneously, and in which the common shaft is connected at one end to the input shaft of a transmission, from the output side of which the wheels are driven, and/or in which the other end of the common shaft is connected with the rotor of an hydraulic retarder system; the specific structure by which the engines are connected with the common shaft including hollow shafts and the use of any suitable types of clutches for transmittably connecting those hollow shafts with the engines; the specific bearing structure arrangement of the hollow shafts in relation to the crank shafts of the engines; the arrangement of additional shafts passing through the hollow shafts and connected with the engine cranks; arrangement of the bearings for the aforesaid shafts which assures maintenance of substantial alignment even in the presence of bearing wear; the use of two carburetors, one for each engine, and controlled from a common throttle pedal to operate one engine substantially within its total power range and to "cut-in" power of another engine to assist the first engine; the arrangement whereby two engines can separately or together power a single shaft while either powers another shaft; the stepping of the hollow shafts in the crank shaft and in a casing which connects the engines; the specific relations of the clutches to the hollow shafts for applying the power of either or both engines to a common shaft; the specific use of a centrifugal clutch acting through an overrunning clutch upon a shaft which powers vehicle wheels and which shaft is also powered by another engine, thus obtaining free wheeling for one of the engines; the use of a single engine controlling the speed of a centrifugal clutch which acts through an overrunning clutch to transmit power from the engine and at the same time to allow free wheeling; the bevel gear drive in relation to hollow shafts, each clutch-controlled from its engine; and the use of part of the power of one of the engines for driving the accessories, and the automatic coupling of its surplus power for driving the vehicle.

Other objects, features, and advantages of the invention will be referred to in the description of the drawings, and in said drawings:

Fig. 1 is a somewhat diagrammatic plan section, showing the general arrangement of certain of the elements concerned in carrying out important phases of the invention herein;

Fig. 2 is a side elevation showing general relations of certain of the elements as applied to a wheeled vehicle;

Fig. 3 is a top plan view, with the tower mechanism omitted;

Fig. 4 is a vertical section through the main and tower casings, taken transversely of the vehicle and approximately on line 4—4 of Fig. 3 and looking forwardly;

Fig. 5 is a vertical sectional elevation through the main and tower casings taken longitudinally of the vehicle and approximately on line 5—5 of Fig. 4;

Fig. 6 is a schematic view of the clutch shift mechanism of Fig. 5, viewed from the position of line 6—6 of that figure;

Fig. 7 is a vertical section through the main casing and through the flywheel housing of the auxiliary engine, illustrating the automatic clutch mechanisms;

Fig. 8 is a detail section of the overrunning clutch taken approximately on line 8—8 of Fig. 7;

Fig. 9 is a face view of the centrifugal clutch, viewed generally from the position of line 9—9 of Fig. 7, but in which, to facilitate illustration, parts are broken away and sections are taken, in different vertical planes;

Fig. 10 is a detail view of the bottom part of Fig. 7, showing one of the centrifugal mechanisms in clutch-in action;

Fig. 12 is a somewhat diagrammatic view, illustrating the means for controlling the large carburetors, respectively of the main and auxiliary engines, from a single pedal;

Fig. 13 is an elevation partly in vertical section taken approximately on line 13—13 of Fig. 12;

Fig. 14 is a plan view of the structure of Fig. 13;

Fig. 15 is a detail plan view of the manual control device for the clutch of the main engine, and associated means for locking the clutch in open position;

Fig. 16 is a vertical section taken approximately on line 16—16 of Fig. 15;

Fig. 17 is a vertical section taken approximately on line 17—17 of Fig. 15;

Fig. 18 is a side elevation of a portion of the auxiliary engine showing its small carburetor and linkage means by which the said carburetor is engine-regulated;

Fig. 19 is a somewhat diagrammatic vertical cross-section on line 19—19 of Fig. 18 further illustrating the linkage means; and Fig. 20 is a section showing part of the rotor of the hydraulic brake means in relation to its stator.

GENERAL SCHEME

Figure 11:
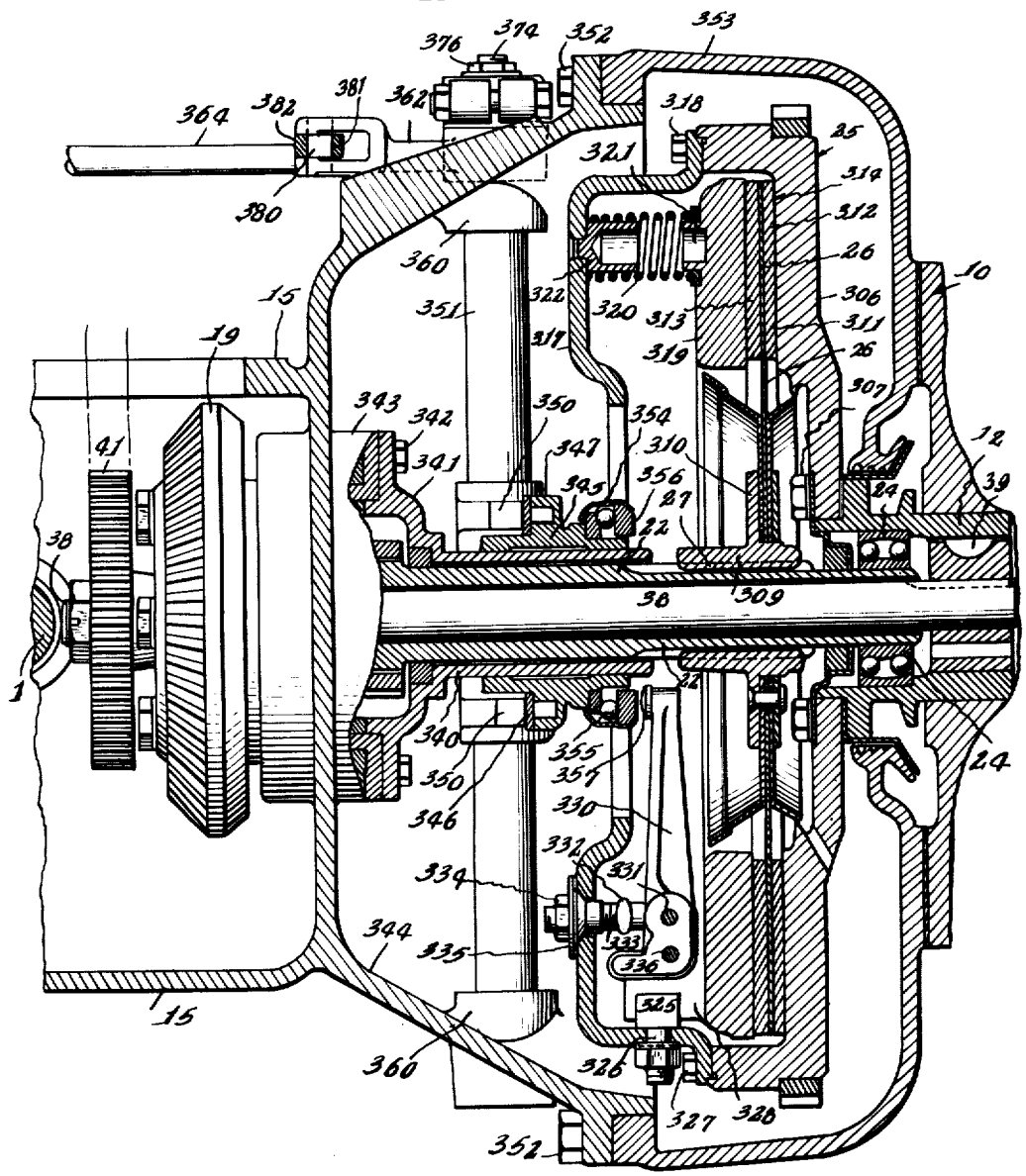
Fig. 11 is a vertical section through the main casing and the flywheel housing of the main engine, illustrating the manually operable engine clutch.

Now referring to the drawings, and to certain important broad phases of this invention, Figure 1 is somewhat diagrammatic, and its elements represent: Means by which either engine can selectively power a common or main shaft, which shaft is mounted on a casing, which in turn rigidly connects the engines by means of their flywheel housings; means by which shafts for transmitting power from the engines to the common shaft can be power-connected, with respective engines; means by which these shafts are held in axial alignment with the crank shafts by being stepped at one end on the corresponding crank shaft and at the opposite end stepped in bearings of the casing which connects the engine flywheel housings; means by which either engine can independently drive an accessory drive shaft; and the means by which the accessory drive shaft can be power-disconnected from both engines in the case where there is a breakdown of accessories demanding their release, so that either or both engines can operate without rotating the accessory drive shaft.

The numeral 1 indicates a shaft which, in the preferred form of the invention, drives the wheels of a vehicle. This shaft is also referred to as the main shaft and is connected at its forward end with the power input shaft 2 (see Figs. 3 and 5) of any suitable form of transmission mechanism generally indicated at 3. The transmission output shaft (not shown) is suitably connected through a propeller shaft 4 with any preferred rear axle drive mechanism generally indicated at 5, for wheels 6. A propeller shaft brake has been indicated at 7. To the opposite end of the shaft 1 is connected the rotor shaft 8 of a hydrodynamic brake mechanism, the casing of which is indicated at 9. The driving of the rotor of this brake in the manner shown is believed to be new, and has advantages, later explained.

Arranged at opposite sides of the shaft 1 and with their crank shaft axes aligned in a direction transverse to the shaft 1 and to the long axis of the vehicle, is an engine 10 herein designated as the main or first engine, and an engine 11 designated as an auxiliary or second engine adapted for driving vehicle accessories and for assisting the main engine in driving the vehicle. These engines are preferably standard, may be of any preferred and suitable type. The crank shaft for the main engine 10 is indicated at 12 and the crank shaft for the auxiliary engine 11 is indicated at 13.

When we speak of engines of the automotive type, it is to be understood that the engines include all of the usual elements needed for their operation. It will be further understood that, although not all shown, the necessary controlled rods and levers are provided for operating the engines from the driver's station.

The engines are cross-connected by a main casing generally indicated at 15, which performs important functions herein. The casing provides opposite front and rear bearings 16 and 17 for the main or wheel driving shaft 1. This casing also provides means rigidly but separably connecting the engines, and the transmission and part of the hydraulic brake mechanism is connected to it, see also Figure 5.

The main casing 15 subserves various functions, each of which is important in the present combination. It provides means rigidly connecting the engines together, it provides rigid bearings for shafts which are directly connected with the crank shafts of the engines; it provides means to which the casing of a suitable transmission mechanism can be attached; it provides means to which a casing for the rotor of a hydraulic brake system can be attached; and it provides means for supporting a casing having therein selective accessory takeoff drive mechanism. The main casing also provides terminal chambers or bells as connecting elements adapted to house part of the clutch mechanism of each engine.

Shaft 1 is provided with a bevel gear 18 meshing on the main engine side with a bevel gear 19 and on the auxiliary engine side with a bevel gear 20. The bevel gear 19 has a tubular shaft 22 which is stepped in a bearing 23 of the main casing 15 and is also rotatably stepped in a bearing 24 of the crank shaft 12 of the main engine. This shaft 22 is therefore so arranged that it can rotate independently of the main engine, and so that the main engine can operate without rotating it. In order to transmit power from the engine to the hollow shaft 22, a clutch designated 25 is provided. This clutch is associated with the flywheel of the main engine (see Fig. 11). A clutch disk member 26 is attached to a sleeve which is keyed to tubular shaft 22 as at 27. This clutch is more fully described herebelow. The clutch may be of the ordinary type, and is manually controlled by the driver through the usual foot pedal (not shown) in the usual manner of clutch control for engines of the automotive type. In the preferred form the bearing 23 is a double row roller bearing structure, and the bearing 24 is of ball-type. The same types of bearings are used for the shaft of gear 20, now to be described.

The bevel gear 20 has a tubular shaft 30 stepped bearings 31 of the case 15, and in bearings 32 of the crank shaft 13 of the auxiliary engine. In this case also the auxiliary engine can run without operating the tubular shaft 30. The shafts 1, 22, and 30, are thus so geared together that rotation of one of the shafts, rotates the other two.

It is a feature of this invention that both engines are controlled from a single pedal, and that when that pedal is depressed to a certain degree, there results an automatic transmission of auxiliary engine power to the vehicle wheels. Moreover this automatic transmission occurs when auxiliary engine speed is the same as the speed of shaft 1, whether that shaft is being driven by the vehicle or by the main engine. This makes for smooth, non-jerky transmission coupling action. For this purpose an automatic clutch mechanism is provided which in the preferred embodiment includes a centrifugally controlled component operating through an overrunning clutch component to automatically couple or transmit auxiliary engine power to shaft 30, gears 20, and 18 to shaft 1, when auxiliary engine speed exceeds a predetermined speed. This automatic mechanism is generally designated 33, and is associated with the flywheel of the auxiliary engine (see Figs. 7, 8, 9 and 10 for details). A clutch disk indicated 34 is secured to the outer race of an overrunning clutch designated 35, the inner race of which clutch is keyed to tubular shaft 30. Centrifugally acting weights 36 cause the centrifugal clutch to take hold or clutch in, as soon as engine speed exceeds a predetermined speed, as will be more particularly described herebelow. Thus far there has been described a mechanism including a wheel-driving shaft which can be driven by either engine or by both engines simultaneously, so that the auxiliary engine can assist the main engine in powering the vehicle wheels.

By having the main shaft 1 and the two hollow shafts 22 and 30 permanently geared together so that rotation of any one of the three shafts rotates the other two, no extra clutch is necessary. Only two clutch means are used, one for the main engine manually controlled, and the other for the auxiliary engine, automatic in action.

Another important feature of this invention relates to the means (see Fig. 1) by which either engine can power a second or output shaft 37, from which all of the various vehicle accessories can be operated or powered. The specific structure is claimed. Thus, in one phase of the invention part of the power of the auxiliary engine is normally used for operating the shaft 37 or its equivalent, and part used for assisting the main engine 10 to power the shaft 1.

To power the output shaft 37 for the accessories, the main engine has a shaft 38 which is keyed as at 39 to the crank shaft 12, and this shaft 38 passes through the hollow shaft 22 and is stepped in a bearing 40 (shown only in Figure 1) carried by the hollow shaft 22. The specific arrangement of this bearing 40 for shaft 38 is like that shown in Figs. 4 and 7 for the functionally similar shaft 41 of the auxiliary engine. The inner end of the shaft 38 has a spur gear 41 meshing with an idler gear 42, in turn meshing with an idler gear 43, in turn meshing with a gear 44 which is rotatable on the output shaft 37. This outer terminal gear 44 of the train has a clutch member 45 engageable by a shiftable tubular clutch element 46 splined to the output shaft 37. In Fig. 1 the shiftable clutch is released from the clutch element member 45.

Stepped in the crank shaft 13 of the auxiliary engine is a shaft 47 functionally similar to the shaft 38. The shaft 47 is keyed as at 48 to the crank shaft 13 and passes through the hollow shaft 30 and is stepped in a bearing 49 in said hollow shaft, see Fig. 7. Fixed to the outer end of the shaft 47 is a gear 50 meshing with an idler gear 51, in turn meshing with a gear 52 rotatable on output shaft 37. This gear 52 has a clutch member 53, and in the drawing the shiftable clutch member 46 is engaged therewith so that shaft 37 will be driven by the auxiliary engine 11. The shift clutch member 46 may assume a neutral position, in which case the output shaft 37 will not be driven.

The gear trains shown in Fig. 1, functionally correspond to means by which the power of either engine can be transmitted to a common power output shaft from which the accessories are driven, either directly, or preferably through intermediate gearing. However, the preferred means by which the shaft 37 is driven and controlled is shown in Figs. 4, 5 and 6. The output shaft 37 is always driven in the same direction, whatever engine may be powering it, and this is also true of shaft 1. In all cases the rotation of the output shaft can be stopped by shifting the lever shown in Fig. 6 to the central or neutral position in which neither clutch is engaged. In both cases the output shaft 37 can be operated from either engine. The unique specific driving train structure of Figs. 4 and 5 is described herebelow and is claimed because of its structural simplicity, simple assembly characteristics and mechanical effectiveness.

*Hydraulic-retarder connecting scheme*

The present invention also provides a new method (see Fig. 20) of connecting the rotor 54 of a hydro-dynamic brake mechanism (see Figs. 1, 2, 3), the rotor casing of which is indicated at 9. The liquid supply intake side of the rotor casing is indicated at 55 and the discharge side at 56, see Fig. 2. The stator as indicated at 57, and 58 indicates suitable means connecting the shaft 1 to the rotor shaft 8. Any suitable form of hydro-dynamic braking device, such, for example, as that shown in Ramey Patent 2,287,130, can be used herein. Since no claim is made to this retarder system per se, no part of the system has been shown other than the rotor, rotor casing, stator, and intake and discharge ports of the rotor casing. The operations of such systems is well known.

Hydraulic retarder units have heretofore been used on heavy duty (freight-hauling) automotive vehicles having the engine in the front and having the usual rear axle drive, but in that use the rotor of the unit is connected to the propeller shaft so that shaft continuity is through the rotor of the unit. Under such conditions when the vehicle speed is substantially reduced the efficiency of the retarder unit falls off rapidly and finally, at low vehicle speed, there is no effective braking action. In our scheme we do not connect the rotor to a shaft which is driven from the output shaft of the transmission. Shaft 1 is coupled at one end with the rotor shaft 8 as at 58 and at the other end (see Fig. 5) with the power input shaft 2 of a conventional or other suitable transmission mechanism. With this application through the transmission the operator can, by shifting to a lower gear, allow for sufficiently high operating speed of the rotor, when vehicle speed is greatly reduced.

Having described the general arrangement of the parts, we will now proceed to describe the new and specific constructions of various elements, certain broad functions of which have been above referred to.

AUTOMATIC CLUTCH MEANS

The automatic clutch means now to be described in detail may have uses other than that shown herein. It is particularly useful as an element in our structure, wherein two engines are used, and in which part of the power of one of the engines is used to power the accessories of the vehicle and in which its surplus power can be intermittently used to assist the other engine in driving the vehicle wheels.

While the primary concern of the present invention is to provide a superior kind of power plant and control therefor, yet we believe that the association of any clutch, including a centrifugal clutch, with an overrunning clutch, to have the former control the latter for automatically obtaining power transmission by an engine to a shaft, provides a new device or element which can be used in environments or combinations differing from our principal use herein. This new element can be used on any engine in which it is desired to obtain automatic transmission of power, or which is adapted to be operated at low speed for one purpose and at a higher speed for another purpose. The transmission clutch means of this invention can also be used in relation to one of a pair of power-generators so that when the load of a first generator becomes too great for its power capacity, a second generator can be caused to couple automatically its power to the first generator. Thus, a standby power unit can be used to augment the power of a primary power unit.

Now referring to Figs. 7 to 10, inclusive. To automatically power the hollow shaft 30 by the auxiliary engine, a multiple clutch mechanism surrounds and acts upon the tubular shaft 30. This multiple automatic clutch means comprises two clutch components or elements, one acting through and in part mounted on the other, one a centrifugal clutch, and the other an overrunning clutch. The main casing 15 has a bell-like housing 60 which is bolted to the flywheel housing 61 of the auxiliary engine 11. The flywheel is indicated at 62 and it is suitably bolted to the crank shaft as shown.

Overrunning clutch component

Splined to the hollow shaft 30 (see Figs. 7 and 8) as at 63 is a tubular inner race 64 of the overrunning clutch. A series of clutch blocks 65 are adapted to rock and obtain wedging clutch-in action against the outer surface of the inner race and the inner surface of an outer tubular race 66. The outer race 66 is mounted on two ball-bearing structures 67 carried by the inner race 64. In Fig. 8 the clutch blocks are in release position. When the rotative speed of the outer race 66 becomes greater than that of the inner race the blocks are rocked in clockwise direction and clutch-in action occurs and the hollow shaft 30 is driven in clockwise direction, as viewed from the left of Figure 1.

Each rock-block has lateral grooves 68, one in each opposite side, and circular constrictive springs 69 lie in the grooves 68, one at each side of the circular series of blocks. This clutch mechanism per se is not claimed herein, but only its particular functional relation to the other elements of the combination. Any suitable type of overrunning clutch can be used.

The outer tubular element or race 66 of the overrunning clutch has a peripheral disk-like flange 72 to which is suitably attached a clutch plate 73, as best shown in Fig. 7. This clutch plate carries suitable friction rings 74 at opposite sides, respectively for engagement with the corresponding clutch surface 75 of the engine flywheel 62 and with the clutch surface 76 of a clutch ring 77 of a centrifugal clutch mechanism now to be described. It is noted that the overrunning clutch, with its clutch disk, is a unit which can be separately assembled on shaft 30, and this is also true of the centrifugal clutch unit now to be described. The entire overrunning clutch unit with its friction disks is free to move axially in either direction on the shaft 30, for engagement and disengagement of its disks 74 with the clutch surfaces 75, 76.

Centrifugal clutch component

The centrifugal clutch, as a unit, includes a casing 80 on which the parts are mounted, which casing is secured to the engine flywheel 62 by bolts 81, so that flywheel speed controls clutch operation. The casing 80 has an annular hub 82 through which the shaft 30 freely passes. Between the inner side of the casing 80 and the clutch plate 73, are disposed two rings, one the clutch ring 77 previously mentioned, and the other a power ring 83 adapted to be moved toward the clutch ring 77, and to apply a proper pressure thereto through a circular series of compression springs 84 only one of which is shown in Fig. 7. Power for closing the clutch is applied through these springs. Sockets in ring 83 receive these springs and they are centered around projections of the ring 77 as shown. The ring 83 is provided with six recesses 85 in its outer face, into which parts of toggle systems (described below) project.

The rings 77 and 83 are mounted on the casing 80 for axial movement and for rotation with the casing 80 as rotated by the auxiliary engine flywheel 62. Means is provided for retracting the rings, to the clutch-open position shown in Fig. 7. Means is also provided for adjusting the tension of the springs 84. The means for retracting the rings includes six bolts 87 each having threaded engagement as at 88 with the clutch ring 77. The power ring is slidable on these bolts, the ring having cylindrical bores for this purpose. On each bolt is an adjustable stop nut 89 engageable with suitable threads of the bolt. By adjusting these nuts the tension of the springs 84 can be adjusted. The bolts 87 extend outwardly through thimbles 90, one thimble for each bolt. Each thimble is mounted in an opening of the casing 80. A spring 92 surrounds each bolt and is contained in the thimble. Each spring is under compression between the inner end of the thimble and a spring tension adjusting nut 93 threaded on the rod 87. The six springs act to retract the rings, that is, move them to clutch-out position, and also to yieldably force wedge surfaces 95 of wedge plates on the ring 83, toward wedges 96 and toward companion wedge surfaces 97 of plates carried on the inner face of the casing 80, as will be more fully described hereafter.

Rings 77 and 83 are centered and connected to rotate with the casing 80, by means of six bolts 98 passing through the wall of the casing 80 and held by suitable nuts, and having rectangular enlargements 99 which abut and project radially from the inner surface of said casing 80. Each enlargement 99 is disposed between and has opposite faces slidably engaged with opposed flat surfaces of a pair of axially extending lugs 100 of the ring 77. The outer surfaces of each pair of lugs 100 are similarly slidably engaged with the opposed surfaces of a corresponding radial notch 101 of the ring 83. Thus, the rings are centered and are free to move axially but must rotate with the casing 80 and, therefore, with the flywheel.

*Centrifugal clutch control mechanism*

The centrifugally operable mechanism for acting automatically to force the ring 83 toward the ring 77 to cause the latter to clutch-in by engaging the clutch ring 74 to press the opposite ring 74 against flywheel surface 75, includes springs and weights and the wedges.

Referring to Figures 7 to 10, inclusive. There are six arcuate wedge plates 104, each providing a wedging surface 95, and these plates are removably secured as by screws to the ring 83. Six corresponding and opposed and arcuate wedge plates 105 provide the wedging surfaces 97, and these plates are detachably secured by screws to the inner face of the casing 80. There are also six wedge blocks 96, one for each pair of plates, and each wedge is separately controlled by a weight-actuated toggle mechanism. For this control each wedge 96 has pivoted thereto at opposite sides, as by a pin 106, two links 107 (see also left side of Fig. 9). These links 107 are in turn pivoted by a pin 108 to three links, two of which are indicated at 109. The links 109 are in turn pivoted by a pin 110 to an inner radial projection 111 of the hub 82 of the casing 80. The pin 108 forms a pivot for one end of a third link 112 which passes freely through an opening 113 in the casing 80. The link 112 is pivoted by a pin 114 (see right side of Fig. 9), between fork elements of the short arm 115 of a bell crank lever, pivoted by a pin 116 between a pair of lugs 117 projecting from the outer face of the casing 80.

The long arm 119 of the bell-crank lever has at its outer end the weight 36 previously mentioned.

Each weight 36 has connections by which it acts centrifugally to compress a pair of coiled springs, when the weight moves under centrifugal action, as when the speed of the engine is sufficiently high. It may be assumed as an example only, that the weights begin to act on the toggles to move the wedges to cause clutch-in action, when auxiliary engine speed exceeds 900 R. P. M. which speed is substantially below its maximum speed rate which may be 2600 R. P. M.

Pivotally connected by a pin 120 to the long arm 119 of the bell crank lever are two links 121. The upper ends of these links are pivoted to a pair of pins 123, each integral with and projecting laterally from a slide head 124. Each head has a spring-centering projection 125, and the heads are slidably guided on two parallel rods 126. Each rod (see middle of Fig. 9) is stepped in an opening 127 of a radial projection of the hub 82, where it is held by a pin. At the opposite end each rod 126 is stepped in a sleeve 128 exteriorly threaded as at 129 and having a projection 130 engaged in an opening 131 of the shelf 132 of a bracket 133 suitably bolted to the outer face of the casing 80. Each rod 125 passes through a tubular spring guide 134. Each guide is in threaded engagement with the threads 129 of sleeve 128. The lower terminal of the spring guide is flanged as at 135. A compression spring 136 surrounds each rod 126 and guide 134, and at one end abuts the flange 135 and at the other end engages around the centering projection 125 of the slide head 124 and abuts the head and forces it to its uppermost position against a stop surface 137. The springs thus act, through the link system, to retract the wedges to the position shown in Fig. 7, and the springs are under initial compression for this purpose. The weights move under centrifugal action against spring tension until they finally assume the position of Fig. 10. At the end of this movement the links 107 and 109 have assumed the aligned position of Fig. 10, at which position wedging action is at its maximum, and the clutch is fully engaged. Outward motions of the weights are limited, as shown, by the engagement of a given weight with an adjustable stop screw 138. Here it is to be noted (see Fig. 10) that in this limit or clutch-in position the short arm 115 of the bell-crank lever has entered between the links 121, the total width of the arm 115 in relation to the axial spacing of the links permitting this entry.

The action of the centrifugal clutch is as follows: When the parts are positioned as in Fig. 7 and when engine speed rises sufficiently, the weights 36 act centrifugally against the action of the springs 105 to move the toggle system to straighten the toggles and drive the wedges outwardly in radial direction, see Figure 10. This radial drive of the wedges results in movement of ring 83 to the left, during which movement the circular series of springs 84 are compressed driving the disk 77 against the friction rings 74 and in turn driving these rings toward the surface 75 of the flywheel.

When auxiliary engine speed is sufficiently reduced the centrifugal clutch moves from its position of Fig. 10 again to the position of Fig. 7. This involves movement of the wedges in an inward radial direction, and decompression of the springs 84, and movement of the rings 83 and 77 to the right under action of the springs 92. With this movement the plates 74 are released and the outer race of the overrunning clutch is no longer positively driven.

No matter what kind of transmission clutch may be used to cause engine power to be transmitted through the overruning clutch, automatic transmission of engine power to shaft 30, can only occur when outer race speed exceeds inner race speed, and the shaft 30, can never drive the auxiliary engine through that clutch when wheel-driving shaft speed is greater than outer race speed. If the speed of shaft 30, and therefore the speed of the inner race, exceeds that of the speed of the outer race (even though the centrifugal clutch is closed), the auxiliary engine cannot be driven through shafts 1, and 30 whether they are driven by the vehicle or by the main engine. The wheel-driving shaft 1, is free to rotate in wheel driving direction when the transmission clutch of the auxiliary engine is out and the auxiliary engine is operating, and when said transmission clutch goes in, no drive of the shaft 1 through the overrunning clutch can occur until engine speed is such as to rotate the outer race at greater speed than the inner race or shaft speed. Thus auxiliary engine power can be transmitted to the shaft 1 smoothly and without jar. Moreover, free wheeling through shaft 1, in relation to the auxiliary engine, can be had at all times except when the auxiliary engine drives the outer race of the overrunning clutch at a greater speed rate than that of the inner race.

It may be said that one or the other of the clutch components acts to prevent one engine from driving the other, and that both components must act together to transmit power from the auxiliary engine to assist the main engine in driving the vehicle wheels.

We have thus provided for automatic release by means of the overrunning clutch when main shaft speed is greater than any auxiliary engine speed, which is above accessory drive speed, and we have also provided for automatic release by a centrifugal clutch. We have also provided for automatic power transmission when auxiliary engine speed is equal to or greater than main shaft speed. The above function can also be performed by a suitably controlled conventional clutch, in conjunction with an over-running clutch. The advantage of the use of a centrifugal or other suitably controlled clutch in association with an overrunning clutch is that auxiliary engine speed can control both power transmission to and auxiliary engine release from, the main or vehicle driving shaft, with the advantages above enumerated.

TOWER CASING AND MECHANISM THEREON

The mechanism now to be described (see Figs. 4, 5 and 6) is a unit, and includes a casing which is detachably secured to the top of the main casing. The gears of this unit are adapted to be meshed with gears 41 and 50, during movement of the unit toward the final position at which it is secured to the main casing 15. Thus the unit can be easily and quickly applied or removed. The unit carries the output shaft 37, and clutch mechanisms by which said shaft can be driven by either engine. One advantage of the structure of the unit is that some of the elements contained in it are interchangeable, being substantial duplicates of one another. Another advantage is found in the mounting structure of the output shaft 37. The bearing structures of this output shaft are formed on a cover which has a gear pump therein.

One form of gear train has been indicated in Fig. 1 and previously described. In the preferred form spur gears 41 and 50, (which may be spiral gears) are driven respectively (see also Fig. 1) by shaft 38 of the main engine, and shaft 47 of the auxiliary engine.

Referring to Fig. 4, the tower casing 140 is detachably secured to the top of the main casing 15 by suitable bolts 141, but however secured it can simply be lifted off to disconnect its gear mechanism from gears 41 and 50, and give access to the interior of the main casing. Assembly is equally simple. The main casing 15 has an opening 142 in its top wall and the tower casing is open at its bottom as at 143, and thus when assembled there is a continuous chamber formed by the main and tower casings, the chamber extending the full height of both. When the casing 140 is removed the elements in the main casing 15 can be easily inspected.

Journalled in the casing 140 are two axially aligned shafts 145, 146. Each shaft is supported at its inner end on a roller bearing, the said bearings being respectively indicated 147, 148, said bearings being held in a suitable cross member 149 supported by opposite walls of casing 140. Each shaft 145, 146 is also stepped at its outer end in a roller bearing and these bearings are respectively indicated 150 and 151, and each of these bearings is held in a removable bearing-carrying structure. These structures are substantially identical and therefore only one is described in detail and the same numerals are applied to each.

The bearing 150 is held in a tubular extension 153 of the bearing-carrying structure 154, which is received in an opening of the upright wall of the casing 140. The support 154 is suitably secured by bolts. This support 154 is provided with communicating oil channels 155 leading to the shaft 145. These channels are in communication with a downwardly slanting channel 156 leading from a cup 157 formed integrally with and on the inner side of the upright wall of the tower casing. This cup is drip-fed from an oil-drip opening 158 leading downwardly from a horizontal cross-channel 159 at the top of the tower casing and this cross-channel communicates with the output side of a pump chamber of a pumping structure described below, see Fig. 5, by means of a channel 160 shown in dotted lines. Leading from channel 159 are other oil-drip openings 161, 162 which deliver oil downwardly to the gears and shift mechanism now to be described. The unit structures which include the output shaft 37 and its mounting and driving means as well as the oil-pump arrangement are features of the invention.

Each of the shafts 145 and 146 has an exteriorly toothed clutch disk fixed thereto. The disk of the shaft 145 is indicated at 166. Keyed to the shaft 145 as at 167 is the elongated hub 168 of a bevel gear 169. Rotatable on this hub is the elongated hub 170 of a spur gear 171 which meshes with the gear 50 driven from the auxiliary engine by shaft 47. Axially shiftable on but nonrotatably secured to the hub 170 is an interiorly toothed, peripherally grooved clutch ring 173 held against rotation on the hub 170 as at 174 by engagement of its interior teeth with exterior teeth on the hub 170. The interior teeth of the ring 173 are adapted to clutch in with or engage the exterior teeth of the disk 166. In Fig. 4 such engagement is shown, so that the gear 171 is connected to the toothed ring 166 to cause the bevel gear 169 to be rotated through the shaft 145. It will be understood that when the clutch ring 173 is moved to the right to disengage its teeth from the teeth of the ring 166, the spur gear 171 will idle and no power transfer to shaft 37 by means of bevel gear 169 will occur.

A construction identical with that immediately above described is provided in relation to the gear 41, which is driven by the main engine through shaft 38. The clutch disk on shaft 146 is indicated at 178. The hub 179 of bevel gear 180 is keyed to the shaft as at 181. The spur gear 182 meshes with gear 41 and has its elongated hub 183 rotative on the hub 179 of the bevel gear, and this hub has teeth thereon cooperating with teeth of the shift ring 184 as at 185. The interior teeth of the ring 184 are engageable with the teeth of the clutch disk 178. In the drawing the clutch ring 184 is shown in unclutched position and therefore the spur gear 182 will idle, and bevel gear 180 will not be driven from shaft 146.

Now referring to Fig. 5, which further illustrates the drive for shaft 37, and shows a unit mounting structure for the shaft which facilitates assembly and which is believed to be structurally unique. The bevel gears 169, 180 are both in mesh with a bevel gear 187 fixed to output shaft 37 and this shaft 37 is journalled in a roller bearing 188 at a point near the gear 187. The bearing is held in a tubular extension 189 of a pump case 190 detachably secured to the outer side of the tower casing by bolts 191. The outer end of the shaft 37 is journalled in the roller bearing 195 held in a tubular extension 196 of a cover 197 for the pump case 190, which cover is also held by the bolts 191.

The shaft 37 has keyed to its outer end a fork element 198 of a universal joint, the other element 199 of which (see Fig. 2) is connected to a shaft 200 in turn connected to a universal joint 201 to an input shaft 202 of an intermediate drive mechanism in a casing 203. The intermediate drive mechanism, later described, of the casing 203 is adapted to control the principal power elements of a plurality of accessories which are supported, at least in part, on the casing, and which casing has no connection with the engines, but is mounted on the bus 204, by any suitable structure, not shown. When we use the word "accessories" we refer to any or all elements used or usable in relation to any kind of automotive vehicle, including electric generators, air conditioning apparatus, fans, pumps, compressors, etc., or any other device or devices which might be operated by the mechanism of this invention.

One of the oil pump gears 211 is keyed to a sleeve 212 in turn keyed as at 213 to the output shaft 37. The other pump gear 214 rotates about a stub shaft 215 suitably stepped in the pump casing cover 197. By means of suitable conduits, not all herein shown, oil is drawn from the bottom of the main casing 15, as a sump, and is distributed to the various parts in the tower and main casings.

The grooved clutch rings 173, 184 are shifted by a mechanism best shown in Figs. 5 and 6. Fig. 6 is schematic, viewing the mechanism from line 6—6 of Fig. 5. This shift mechanism comprises a horizontal rod 216 fixed in openings 217 of the walls of the tower casing, 140. Slidable on this rod are a pair of shift members 218, each having a fork 219 entering the groove of a corresponding clutch ring. At a point on the rod between the shiftable members 218 is a shiftable block 220 having a socket 221 which receives the ball 222 of a shift arm 223 secured to a shaft 224 journalled as at 225 in the slanting wall 226 of the tower casing. Springs 233 and 234 are interposed between the block 220 and the shift members 218, to obtain positive clutch-in action. A hand lever 227 is fixed to one end of the shaft 224 and is adapted for engagement with notches 228, 229, 230 in an elongated projection 231 integral with the wall of the tower casing. Stops 235 limit members 218 at clutch-in positions.

In Fig. 6 the hand lever 227 is positioned in notch 228 as when the auxiliary engine is transmittably connected to the output shaft 37, as in Fig. 4. This lever may be shifted to the middle notch 229 to disconnect all engine power from the shaft 37. When the lever is in the notch 230 the output shaft is adapted to be driven from the main engine through the gears 41, 182 and bevel gear 180.

The shaft 37 with its bearings and the pump gears constitute a unit, bodily separable from the tower casing 140, just as the tower casing unit is bodily separable from the main casing 15. Thus, the tower casing and its contained mechanism, as well as the shaft 37 and the pump, are easily separable as units. During separation of the tower casing the gears 171, 182 are simply raised out of mesh with the gears 50 and 41.

COORDINATED CONTROL OF ENGINE CARBURETORS

An important broad phase of this invention is related to the conception of coordinately controlling the carburetors of two engines so that the carburetor of one of the engines by which that engine is operated for a lower power output, can be overridden to cause carburetor operation of that same engine for higher power output, for augmenting the power of the other engine.

In the present disclosure, three carburetors are shown and claimed, two on one engine, and one on the other, but there is no intention to limit the broader phase of the invention to any particular number of carburetors, since the gist of this phase of the invention is the control of carburetion to override lower power carburetor operation, to obtain higher power carburetor operation, and to coordinate such a control with carburetion control of a second engine.

Another important part of this invention is the method of control of two carburetors by means of a single control element, moving from an initial to a final position, and vice versa. In this embodiment the control is such that during the first portion of the movement of the control element from an initial to an intermediate position, the valve of the carburetor of a first engine is opened and is operable through the greater part of its power range without causing opening of the valve of the carburetor of a second engine. Then during continued movement of the control element from this intermediate position to final position, the valve of the carburetor of the second engine is opened and is operable through its entire power range, while the carburetor action of the first engine continues and thus the action of both carburetors together is so maintained that the second engine assists the first engine in powering a single shaft, from which the wheels of an automotive vehicle may be driven. The third carburetor is engine-regulated, in a manner later to be described.

Referring to Figs. 3, 12, 13 and 14. The main engine 10 has a carburetor 236 and the auxiliary engine has a carburetor 237. These carburetors are sometimes referred to as large, in contrast to a carburetor of smaller capacity which is automatically regulated for operation of the auxiliary engine at a lower power output, as when it is powering the accessories, only. These large carburetors have been diagrammatically shown and may be of any suitable type. The carburetor 236 has a butterfly valve 238 on a shaft 239, said shaft, see Fig. 13, having an arm 240. The auxiliary carburetor has a butterfly valve 243 on shaft 244 having an arm 245. Normally the butterfly valves of both carburetors are initally closed, but carburetor 236 can be operated at almost capacity before the valve of carburetor 237 begins to open. The control mechanism is best shown in Fig. 12, where it is shown in its initial position.

In this instance cams in the form of slots are used for controlling the valve arms 240 and 245 to in turn respectively control the valves 238, 243, and these cam slots are formed in plates 246, 247 which are fixed to shaft 250 stepped at one end in a bearing 251 of casing 252 and at the opposite end in bearing 253 of casing 254. Casing 252 is preferably attached, as shown in dot-and-dash lines in Fig. 3, to the bell of the main casing 15 which connects with the flywheel casing of the main engine 10, and the casing 254 is preferably attached to some part of the auxiliary engine as indicated in dot-and-dash lines in Fig. 3. The cam plate 246 has a cam slot having angularly related portions respectively designated 255, 256. Cooperating with this cam slot is a roller 257 carried by an arm 258 secured to a shaft 259 rotative in a bearing 260 of the casing 252. The opposite end of the shaft 259 has an arm 261 fixed thereto which is connected by a link 262 to the arm 240 which operates the butterfly valve 238. The action of the portions of the cam slot is described herebelow. The parts are in their initial positions in all figures.

The cam plate 247 has a cam slot having angularly related portions 264, 265, see Figure 12. A roller 266 cooperates with the cam slot and is rotatable on arm 267 affixed to a shaft 268 rotatable in a bearing 269 of a casing 254. The outer end of this shaft has an arm 270. To this arm is pivoted a link 271, and the lower end of this link is connected to the arm 245 which controls the butterfly valve 243 of the large carburetor 237 of the auxiliary engine. The carburetor operating elements, with the exception of the shapes of the cam slots, are substantially identical and are thus interchangeable. The cam shaft 250 is provided at one end with an operating arm 274 to which is connected a link 275.

Any suitable linkage means between the pivoted control pedal 276 or other suitable control element, and the link 275 may be used. The character of the linkage will vary according to the location of the driver's seat 276. In this case the mechanism includes four transversely arranged shafts 277, 278, 279, 280, each having two arms, the arms and their shafts acting in the manner of bell crank levers. Suitable links connect the arms as shown. The arrows show the direction of rotation of the arms during pedal depression. In this instance, but not necessarily in all instances, both the control pedal and the cams move in clockwise direction from their initial toward their final positions. Dot-and-dash lines show the limit final positions of the linking system and pedals 276. In the case of the pedal, one of its intermediate positions is also shown in dot-and-dash lines.

*Operation of carburetor control device*

Now referring to Fig. 12. The initial position of the pedal, or other suitable control element, is indicated by the letter A, the intermediate position by the letter B, and the extreme or final position by the letter C. The same letters have been applied to indicate corresponding positions of the cam plates. A, corresponds to closed throttle, B to partly open throttle and C to substantially fully open throttle. For the auxiliary engine, pedal movement from B to C corresponds to closed to fully open position of throttle 243.

For example only, it has been assumed and has been so indicated on the drawing, that the movement of the pedal from A to intermediate position B includes an arc of 21° and that the total arc of pedal movement from A to C is 35°. Correspondingly, the movement of the throttle-operating arm 240 of the main engine 10 from A to B has been assumed to represent about 90% opening of the throttle after passing through an arc of 76½°. Movement from A to C corresponds to substantially total opening of throttle 238 after movement of the arm 240 through an arc of about 85°. These assumptions and the numbers are merely for the purpose of facilitating explanation and no limitation of the invention is intended by their use.

During movement of the pedal 276 from A to B the slot portion 255 of the cam slot of the plate 246 causes the main engine throttle to move through about 90% of its total opening movement. During engagement of the cam slot portion 256 with the roller 257, while the pedal travels from B to C, the main engine throttle 238 opens about an additional 10% and when the pedal arrives at C the throttle 238 is fully open. While the cam portion 255 of the main engine cam is moving a distance which corresponds to a pedal movement from A to B the cam slot portion 264 of the auxiliary engine does not act upon its roller 266. Cam action only begins on this roller 266 after pedal depression is continued beyond the point B, that is, after the main engine throttle is about 90% open. Thus, the main engine can be operated at nearly full throttle before the carburetor of the auxiliary engine opens. As soon as the pedal begins to move from point B to point C the cam slot portion 265 of the cam for the auxiliary engine engages the roller 266, and the throttle 243 of the auxiliary engine begins to open and continues to open until by the time point C is reached by the pedal 276, the auxiliary engine throttle is fully open, and both engines are operating substantially at full capacity. Thus, the surplus power of the auxiliary engine has been utilized to assist the main engine in powering the vehicle, and at the same time the auxiliary engine can continue to power the accessories.

It will be noted that in the preferred embodiment of this invention the depression of the pedal beyond the point B results in giving the auxiliary engine such an accelerated speed (over and above that needed to power the accessories), that its clutch means goes in automatically. Therefore depression of the pedal beyond point B corresponds to an action by which auxiliary engine power is automatically coupled with main engine power to drive the vehicle wheels. Note that the main engine can be accelerated from zero to almost full capacity while the pedal is being moved from A to B, and that when the pedal is depressed beyond the point B, not only does the auxiliary engine come into operation, but main engine operation is continued.

Insofar as we are aware, no functional equivalent of the control herein has ever been applied, either to the control of the total power of the two engines for powering a single shaft or for the control of two engines for powering the wheels of an automotive vehicle or for the control of two engines to use part of the power of one and all of the power of the other to power a shaft or vehicle wheels.

When the stand-by power of the auxiliary engine is no longer needed to assist the main engine, the pedal is moved or is allowed to move counterclockwise or opposite direction to position B, at which time the valve 243 of the carburetor 237 of the auxiliary engine is closed, and the automatic clutch goes out or disconnects the auxiliary engine, so that it no longer powers shaft 1, which the main engine continues to power.

It has been previously noted that auxiliary engine operation at about 900 R. P. M. is controlled through an engine-governed regulated carburetor (see Figs. 18, 19 and 3) which is initially fully open and which is adapted to be automatically moved in such manner as to balance engine power output against the power demands of any number of accessories, it being understood that there is considerable variation in accessory power demand.

Referring to Figs. 3, 18 and 19. The operating arm 290 of a conventional engine-regulated device designated 291, is shown in Figures 3 and 19. Neither the structure of this regulator nor the manner of operating it from the engine has been shown because it may be of any preferred well-known type. The governor can be mounted and engine-connected in any suitable way. It may be disposed on the side of the motor and put in gear with the cam shaft or the governor case can be mounted between the carburetor and the intake manifold and driven by a shaft from any convenient driving outlet in the flywheel housing, or the governor can be mounted on the front of the timing gear housing and driven directly from the timing gear, or it can be driven from a gear on the generator shaft which in turn is driven from the timing gear.

The arm 290 acts to close the small carburetor when auxiliary engine speed exceeds 900 R. P. M., and this arm is shown in its initial or throttle-open position in all the figures. The operative relations of the large and small carburetors are such that fuel is constantly fed to the auxiliary engine, during switchover from one carburetor to the other. As viewed in Fig. 18, the regulator arm moves in counterclockwise direction to close the small carburetor. The arrangement is thus such that on starting the auxiliary engine, engine speed may rapidly rise to 900 R. P. M. The regulator arm 290 is connected by a link 292 to one arm of a bell-crank lever 293, which is pivotally mounted on a suitable bracket 294 carried by the engine. The opposite arm of this bell crank lever 293 is pivotally connected to a link 295 which in turn is pivotally connected to a bell crank lever 296 which is pivoted to a bracket 297 on the top of the intake manifold 298 of the auxiliary engine. The opposite end of this bell crank lever 296 is connected by a link 299 to arm 300. This arm 300 is connected to a shaft 301 which operates the butterfly valve 302 shown in dotted lines in Figs. 18 and 19. The small carburetor is somewhat diagrammatically indicated at 303 and may be of any preferred type.

In Fig. 18 the arm moves from the position shown in counterclockwise direction to close the throttle 302 of the small carburetor when auxiliary engine speed exceeds 900 R. P. M. By having the carburetor normally open the auxiliary engine can promptly deliver the power required for the operation of all the accessories as soon as the engine is started. When it is desired to have the auxiliary engine assist in powering the vehicle, acceleration of that engine by the use of the large carburetor to bring auxiliary engine speed above 900 R. P. M. causes prompt closure of the small carburetor through its regulating device 291. On the other hand, as soon as the need for the use of auxiliary power ceases and the operator closes the throttle of the large carburetor of the auxiliary engine and engine speed is reduced to 900 R. P. M., the small carburetor is promptly opened by the regulator and the auxiliary engine continues to operate only on the small carburetor to furnish power to all accessories.

MAIN ENGINE CLUTCH AND CONTROL MEANS THEREFOR

The main engine clutch (see Fig. 11) is generally designated in Fig. 1, as 25, and may be of any suitable conventional type and is associated with the flywheel 306, said flywheel being secured as by bolts 307 to the crank shaft 12. Keyed as at 27 for axial movement on the hollow shaft 22 is a sleeve 309 having a peripheral flange 310 to which is attached as by rivets a clutch ring supporting plate 26, and on the opposite sides of this plate are attached clutch rings 312 and 313. The ring 312 engages a clutch surface 314 of the flywheel. In the figure the clutch is shown in "in" or clutched position, which is its normal position.

The clutch further includes a casing 317 attached to the flywheel by suitable bolts 318. Connected with and supported on the casing 317 is a clutch ring 319 which engages the clutch ring 313 and moves the clutch structure against the surface 314. This ring 319 is therefore mounted for axial movement and is normally pressed into clutch position by a circular series of springs 320, only one of which is shown. The springs are centered and held by projections 321, 322 respectively on the ring 319 and casing 317.

The clutch ring is supported on casing 317 and is centered and held against rotation by means of a plurality of circumferentially arranged cubical projections 325 (only one shown). Each of these projections has a screw-threaded stem 326 which passes through an opening in the casing 317 and is held by a nut 327. Opposite surfaces of each projection 325 engage corresponding opposite surfaces of a pair of extensions 328 of the clutch ring 319. The clutch ring 319 is moved away from clutch-in position by a series of radially arranged levers 330 of the first class, only one of which is shown.

Each lever 330 is pivotally fulcrummed as at 331 to an adjustable structure which passes through an opening in the casing 317 and which includes an inwardly extending bolt 332. Each bolt is threaded as at 333 and has a jamb nut 334 which engages a washer, which in turn engages a conical sleeve 335, which sleeve is in threaded engagement with the bolt 332, and this sleeve passes through an opening in the casing 317. This fulcrumming structure provides means for axially adjusting the ring 317 in relation to the clutch surface 314 of the flywheel 306. The terminal of the long arm of each lever is disposed near the hollow shaft 22 in a position to be engaged by part of a shift mechanism presently to be described. The short arm of each lever is pivoted as at 336 to and between a pair of the projections 328 of the ring 319.

When the long arms of the levers 330 are moved in clockwise direction as viewed in Fig. 11, that is toward the right, the clutch is opened. In order to move the levers 330 a shiftable mechanism is provided which is mounted on a tubular extension 340 integral with a cap plate 341, this plate being secured by bolts 342 to an extension of the casing 15, which lies within the bell 344 of that casing. The cap plate is associated with bearing structures for the shafts 32 and 28. These bearing structures are substantially duplicates of that shown in Fig. 7 for the shafts 30 and 47.

Slidable and rotatable on the tubular extension 340 is a shift sleeve 345 having an annular thrust plate 346 suitably secured as by pins to a flange 347. The wear plate is engaged by fork-arms 350 fixed to a vertically disposed clutch-operating shaft 351. This shift is journalled in upper and lower bearings of the bell structure 344 and this bell structure is bolted as at 352 to the flywheel housing 353 of the main engine 10. The inner end of the sleeve 345 has fixed thereto a bearing ring 354 engageable with bearing balls 355 which in turn engage a rotatable lever-thrust ring 356 adapted to engage the ends 357 of the long arms of the levers 330 to control the levers for operating the clutch.

The operation of the shaft 351 and of the lever-moving structure just described is controlled by the usual foot pedal (not shown) connected by suitable linkage means, part of which are conventional and part of which are unique in the combination herein. This linkage means operates not only to disengage the clutch of the main engine, but includes means by which the clutch can be locked in open position, as when there is a main engine breakdown. Ordinarily the clutch is operated in the normal manner by pedal and is released when shifting gears and then at the proper time is allowed to go in. The clutch is held in by means of the springs 320.

*Control linkage for main-engine clutch*

That part of the linkage means for the main engine clutch, which is claimed herein is shown in plan view in Figs. 3 and 15, and also in Figs. 16, 17, and 11. It is to be noted that part of this mechanism is mounted on the bell 344 of the main casing 15 and part on the bell 60 of said main casing.

The vertical shaft 351 rotates in suitable upper and lower bearings 360 of the bell portion 344 of the main casing 15. Rotatable on this shaft as shown in Fig. 16 is a bell-crank lever, the long arm of which is shown at 361 and the short arm at 362. The bell-crank lever can therefore be axially swung about the shaft 351, but it is indirectly but adjustably fixed to rotate the shaft 351, by means of a slotted arm in a manner hereinafter described. The outer end of the long arm 361 is forked as shown at 363 and one end of a link 364 lies between the arms of the fork.

To permit the arm 361 of the bell-crank lever to be moved independently of the link 364, to and locked in a position to hold the engine clutch open (in case of a main engine breakdown), the link 364 is slotted as at 365 and a pin 366 of the arm 361 passes through the fork and the slot as shown in Fig. 16. Normally, as when the clutch is in, the pin 366 is engaged with the outer end 367 of the slot, but in cases of main engine breakdown, means is provided for locking the clutch in open position and for this purpose the arm 361 is moved to the left (Fig. 15) until pin 366 engages the inner end 368 of the slot 365. Thus, this adjustment can be made while the link 364 remains in the position shown in Fig. 15, which corresponds to the initial or up position of the clutch pedal (not shown). If, while the pin 366 is engaged with the end 368 of the slot, the clutch pedal should be depressed by the operator, lost motion occurs and no action by the link 364 on the pin 366 will take place as link moves to the left. The length of the slot 365 corresponds to the full range of clutch pedal movement.

To fix the bell-crank lever to the shaft 351 and yet allow angular adjustments of said lever in relation to said shaft, a short arm 371 is keyed to the shaft 351 at a level above the bell-crank lever as at 372. This arm has an arcuate slot 373, the center of curvature of which is in the axis of shaft 351. Passing through the slot, see Fig. 16, is the stem 374 threaded into the long arm 361 as at 375, and the opposite end of the stem is threaded and a clamp nut 376 engages therewith and acts through a washer to clamp the arm 371 to the arm 361. The long arm 361 has a stop screw 377, with which the arm 371 engages.

The means for holding the bell-crank lever in clutch-open position comprises a pin 380 on the short bell-crank arm 362, passing through a slot 381 of a link 382, which link has a swivel connection with a screw-threaded rod 383, the swivel connection being indicated at 384. The threads of this rod engage the threads of a block 385 pivoted as at 386 in a suitable bearing 387 of the bell 344 of the main casing 15. The threaded rod 383 has a hand-wheel 388 by which it can be rotated, and the rod is provided with a threaded jamb nut 389 which engages the block 385 as shown. To move the clutch to and hold it in open position all that is necessary is to rotate the rod 383 to move it in direction of the arrow to bring the outer end 390 of the slot 381 into engagement with the pin 380, and after such engagement to continue the motion of the rod 383 until the bell-crank lever has been moved sufficiently to bring its pin 366 into engagement with the end 368 of the slot 365. After this is done the jamb nut 389 is set. The length of the slot 381 is such as to allow sufficient motion of the bell-crank, to release the clutch, in normal operation.

The link 364 has a terminal fork which receives the outer end of an arm 391, through which arm and fork a pivot 392 passes. The arm 391 is fixed to a sleeve 393 which rotates about a stud 394 secured by a nut 395 to a bracket 396, in turn secured to the bell 60 of the main casing 15. The sleeve 393 has another arm 397, the outer end of which receives and is pivoted to a fork 398 of a link 399, which link is suitably connected by any suitable linkage members to a clutch pedal (not shown). Normally, pressure on the clutch pedal moves the link 399 in the direction of the arrow and this results in movement of the link 364 to the left to disengage the clutch.

*Intermediate accessory drive means*

Referring now to Figure 2. A feature of this invention is related to the supporting of the accessories independently of the engine, and to the driving of the accessories through shafts and gearing which are mounted in a case, on which all of the accessories or parts thereof are mounted. Thus, none of the accessories are supported by or directly driven from the engine, and speed change gearing can be used to regulate accessory speed, in accordance with varying engine speeds, as when auxiliary engine speed is accelerated to assist in driving the vehicle. In carrying out this phase of the invention the casing 203 houses and provides bearings for any suitable intergeared driving mechanism which can be driven from the input shaft 202.

In this embodiment the shaft 202 is provided within the casing 203 with a bevel gear 402. This bevel gear meshes with another bevel gear 403 mounted on a main drive shaft 404 suitably stepped in bearings (not shown) in the casing 203. The gear 403 drives a spur gear 405 which suitably drives a countershaft (not shown).

The casing 203 is supported on the vehicle in any suitable manner (not shown) at a level above the engine in a position accessible by entry from the back of the bus. It is contemplated that the power takeoffs for all of the accessories (diagrammatically represented) be arranged in the casing 203 and that some, if not all, of the accessories be supported by the casing 203, or that some part of each accessory, or its main drive element, will be so supported. For example, an electric generator 406 is supported on the case 203 and is driven from the main shaft 404. A compressor 407 for the air conditioner is driven through bevel gears 408, 409 and shaft 410 from main shaft 404 by gearing 411. The air compressor 412 is driven from the main shaft through a series of gears, one of which is designated 414. An oil pump shaft (not shown) may be driven through the same train which includes gear 415.

It is not the intention herein to claim an intermediate transmission mechanism of particular structure, by which the accessories are driven, but broadly to claim the use and arrangement of a suitable intermediate mechanism in the transmission line from the engine to the accessories, in which no part of the mechanism is supported on an engine, or subject to vibration therefrom, and in which the case that encloses the intermediate accessory drive mechanism also supports all accessories, or some of the parts of all accessories or some parts of some of the accessories.

GENERAL OPERATION

To give one example of the power demands and operation of the device herein in response thereto, let it be assumed that each of the engines can develop 150 H. P. at 2600 R. P. M., when the engine throttle is fully open. Then assume that the vehicle is being driven by the main engine at 60 M. P. H., over a level road, and that there is a power demand of only 80 H. P. Now assume that the power demand rises to 135 H. P. Then the main engine must be operated at about 90% throttle.

Now assume a demand for power output of 200 H. P. The operator moves the pedal 276 into the B—C range, and thereupon the large carburetor of the auxiliary engine is opened. When this occurs auxiliary engine speed accelerates sufficiently to transmit power for vehicle drive. It may be assumed that in order to utilize the entire surplus power of the auxiliary engine its large carburetor will require about 39% opening movement of the throttle, and that this total surplus power can be obtained while the pedal moves from B to C.

Thus, when maximum power demand occurs while the main engine (or the main shaft driven thereby) is operating at speeds above the accessory drive speed of the auxiliary engine, the pedal 276 is brought into its B—C range and the auxiliary engine is accelerated on its large carburetor. Then the centrifugal clutch engages and then the overrunning clutch engages to transmit power for vehicle drive, when auxiliary engine speed is equal to main engine speed or to main shaft speed.

If, when power is to be transmitted by the auxiliary engine, main engine speed and therefore main shaft speed is below the accessory drive speed of the auxiliary engine, then the operator opens the main engine clutch and shifts the transmission gears so as to be able to bring main shaft speed to a speed greater than the engaging or closing speed of the automatic clutch, and then, after bringing the main shaft to that speed, the auxiliary engine is accelerated and the overrunning clutch engages to transmit power to the main shaft.

When both engines are driving the main engine shaft, and the main engine clutch is released for the purpose of shifting transmission gears, such a shift can be made without waiting for the release of the automatic clutch. To do this, the accelerator pedal 276 is so moved as to cause momentary reduction in auxiliary engine speed in relation to main shaft speed, which permits the overrunning clutch to open and free the auxiliary engine from transmission connection with main shaft.

When need for maximum (two-engine) power demand ceases, the pedal 276 is moved to its A—B range, which results in release of the overrunning and centrifugal clutches, and then auxiliary engine control is taken over by the small carburetor, to continue operation of the engine at governed accessory drive speed. Under these conditions, the overrunning clutch is first to release, and then the centrifugal clutch releases.

The main engine and main shaft can operate at needed speed above auxiliary engine speed, while the auxiliary engine is driving accessories, because the overrunning clutch is always free whenever its inner race is rotating at greater speed than its outer race. On the other hand whenever the centrifugal clutch goes in, the overrunning clutch will transmit power when the speed of its outer race is the same or greater than the speed of its inner race, that is when outer race speed overtakes the inner race speed.

The use of two engines, each with its own clutch, has a distinct advantage over the use of a single clutch for transmitting torque from two engines. By having two clutches, reasonable clutch over-capacity can be provided for long life, without the necessity of providing a considerably larger clutch structure of special design.

It is to be noted that with constant load the degree of throttle opening decides engine speed, within the capacity of the engine, and that with a given engine speed the degree of throttle opening decides the amount of power output of the engine. Attention is called to these well known facts because it is well to keep them in mind in considering the relations of two engines either of which separately or both simultaneously may be required to drive a common shaft which in turn drives the vehicle wheels. For example, the main engine may be driving the shaft at full throttle but at relatively slow speed because of adverse load or road conditions. This is the condition under which transmission of power from the auxiliary engine is demanded. Thus, in order to obtain transmission from the auxiliary engine, the operator accelerates auxiliary engine speed and at the proper acceleration the automatic clutch means goes in, and the outer race of the overrunning clutch is driven. When outer race speed exceeds inner race speed, automatic transmission of power to shaft 30 occurs. This explanation is also made because although in this disclosure the auxiliary engine power is only transmitted to assist in wheel driving when its speed rises above that normally used for driving the accessories, and although this arrangement is specifically claimed, yet the invention need not be entirely limited in that regard. It is conceivable that the clutch of the auxiliary engine need not be of a centrifugal type but can be of the ordinary type, as is that of the main engine and can be so controlled that it can be clutched-in whenever extra power is needed for wheel driving, and because of the particular inter-relation of the overrunning clutch, transmission of power will only occur when auxiliary engine speed rises to that of common shaft speed. In other words when an overrunning clutch is used, this transmission occurs only when outer race speed exceeds inner race speed.

Although specific degrees of carburetor opening in relation to degrees of control pedal depression have been given and although certain engine speeds have been assumed for the sake of illustration, there is no intention to limit the invention by such recitations. The engine speeds may be varied within wide limits and various other ratio relations between the degree of pedal depression and the degree of throttle opening may be had.

In controlling the auxiliary engine and speeding it up so that its power is automatically transmitted to assist the main engine in driving the vehicle, advantage is taken of the natural movement of the throttle pedal. Ordinarily, when one wants more power the pedal is advanced to a greater degree. This same principle is used herein and in order to couple the power of the auxiliary engine for driving the wheels the pedal 276 is simply pressed down a little farther, and after such depression and until total depression movement is reached, the auxiliary engine is gradually accelerated until it is delivering its full surplus power, for powering the vehicle.

Since the best fuel-operating economy is obtained with a fully open carburetor, we use a small carburetor on the auxiliary engine for powering the accessories and operate it at or near full throttle. Since in vehicular use the accessories must be constantly powered, we obtain the best fuel economy for this purpose by the use of such a small carburetor, and use a larger carburetor only temporarily for assisting the main engine in powering the vehicle, or for alone powering the vehicle and the accessories.

We believe that an important factor which has enabled us to successfully coordinate two engines is related to the use of two types of clutches, in such manner that auxiliary power transmission can only occur when auxiliary engine speed rises to that of main engine speed, and in such manner that the main engine can never drive the auxiliary engine through the clutches.

What we claim is:

1. A wheeled vehicle having a wheel driving shaft in constant transmission connection with first and second tubular shafts so that rotation of one of said shafts will rotate the other two, first and second engines, an overrunning clutch having its inner race on the second tubular shaft, a disc clutch having its driven element on the outer race of said overrunning clutch and having its other element driven by the second engine, the overrunning clutch being adapted to clutch in only when its outer race is being driven by the second engine, and said first engine having a transmission clutch adapted to drive the first tubular shaft, a fourth shaft for driving the acessories of the vehicle, and means by which either engine can drive said fourth shaft, including elements which pass through said tubular shafts and are driven from the crank shafts of respective engines.

2. A device of the class described comprising, a shaft, first and second engines each having a carburetor, said second engine having also an engine-regulated carburetor adapted to close when said second engine speed exceeds some predetermined speed, selective means by which the first engine can transmit power to said shaft, means by which the second engine can automatically transmit power to said shaft only when said second engine speed exceeds the aforesaid predetermined speed, and means adapted to so control the first mentioned carburetors that a large but less than total range of carburetor action for the carburetor of the first engine can be obtained without effecting an operation of the carburetor for the second engine and so that when the upper limit of action of the carburetor of the first engine is nearly reached the carburetor of the second engine is operated to obtain engine speed above that permitted by its regulated carburetor while continuing the acting of the carburetor of the first engine.

3. A device of the class described comprising, a wheeled vehicle, a shaft adapted to drive the wheels of the vehicle, first and second engines each having a carburetor, said second engine having a second engine-regulated carburetor adapted to close when said second engine speed exceeds some predetermined speed, means by which the first engine can transmit power to said shaft, means by which the second engine can automatically transmit power to said shaft only when said second engine speed exceeds the aforesaid predetermined speed, and means adapted to so control the first mentioned carburetors that a large but less than total range of carburetor action for the carburetor of the first engine can be obtained without effecting an operation of the carburetor for the second engine and so that when the upper limit of action of the carburetor of the first engine is nearly reached the carburetor of the second engine is operated to obtain an engine power output above that permitted by its regulated carburetor while continuing the action of the carburetor of the first engine.

4. A device of the class described comprising, a shaft, first and second engines each having a carburetor, said second engine having a second engine-regulated carburetor adapted to close when said second engine speed exceeds some predetermined speed, means by which the first engine can transmit power to said shaft, means by which the second engine can automatically transmit power to said shaft only when said second engine speeds exceeds the aforesaid predetermined speed, and means adapted to so control the first mentioned carburetors that a large range carburetor action for the carburetor of the first engine can be obtained without effecting an operation of the carburetor for the second engine and so that when the upper limit of carburetor action of the first engine is almost reached the carburetor of the second engine is operated to obtain an engine power output above that permitted by the engine-regulated carburetor while continuing the action of the carburetor of the first engine, said last mentioned means including a control member movable from an initial to a final position and in which the first part of the movement of said member to an intermediate position operates to control wide range action of the carburetor of the first engine and in which continued movement of said control member beyond said intermediate position toward final position initiates operation of the carburetor of the second engine.

5. A device of the class described comprising, a shaft, first and second engines each having a carburetor, means by which each engine can transmit power to said shaft, a control member movable from an initial to a final position, and means mechanically interconnecting the control member with said carbureter including cams operable by said member and adapted to so control the carburetors that a large range carburetor action for the carburetor of the first engine can be obtained and maintained during movement of the control member from its initial position to an intermediate position, and so that continued motion of said control member in the same direction beyond said intermediate position initiates and maintains operation of the carburetor of the second engine while continuing action of the carburetor of the first engine.

6. A device of the class described comprising, a shaft, first and second engines each having a carburetor, means by which the first engine can transmit power to said shaft, means by which the second engine can automatically transmit power to said shaft only when engine speed exceeds some predetermined speed, a control member movable from an initial to a final position, means operable by said member and adapted to so control the carburetors that a large range carburetor action for the carburetor of the first engine can be obtained and maintained during movement of the control member from an initial to an intermediate position, and so that continued motion of said control member beyond said intermediate position and toward final position initiates and maintains operation of the carburetor of the second engine to give that engine a speed in excess of said predetermined speed, while continuing action of the carburetor of the first engine.

7. A wheeled vehicle having first and second engines, means by which the engines can simultaneously drive the vehicle wheels, including means associated with the second engine which causes that engine to automatically transmit its power to the vehicle wheels only when its speed exceeds a predetermined speed, an engine-governed carburetor for said second engine for controlling its operation only up to said predetermined speed, a second carburetor for said second engine adapted to operate the engine at speeds higher than said predetermined speed, a third carburetor for the first engine, a pedal, and means operable by the pedal for controlling the second and third carburetors to obtain operation of the carburetor of the first engine substantially through its entire range without operating the second carburetor and for causing the second carburetor to operate the second engine at a speed exceeding its predetermined speed, whereby to cause said second engine to automatically transmit its power to the vehicle wheels to assist the first engine in its power operation of the wheels.

8. A device of the class described comprising, an engine having two carburetors, one of which is engine-regulated to limit engine speed to a predetermined speed and power output limit which is substantially below its power output capacity, and the other of which is adapted to operate the engine for power output above that predetermined limit, a first shaft and means by which it is driven by the engine, a second shaft and means by which engine power is automatically coupled to drive it only when the engine is operated above the speed at which it is limited by said governed carburetor.

9. In combination with an automotive vehicle having a main shaft connected to drive the wheels, first and second engines and means by which either separately or both together can drive said main shaft, said second engine having a small engine-regulated carburetor adapted to close when engine speed is substantially less than its total speed and power capacity, and having a large carburetor for operating the second engine at speeds above that for which the small carburetor is used, said second engine having means automatically operable to power-connect it for driving said main shaft only when said second engine speed exceeds its lesser speed range.

10. In combination with a wheeled vehicle having a wheel-operating shaft, and having accessories, an engine and means by which it can drive the wheel-operating shaft, means by which the engine can drive the accessories independently of the drive of the wheel shaft, said engine having a first carburetor engine-regulated for fueling the engine only through a predetermined lower power range for driving the accessories, and having a second carburetor for fueling the engine only through a power range above the fueling range of the first carburetor, driver-operable movable means for controlling the second carburetor, said engine having centrifugally operable means automatically operable to cause transmission of power from it to said wheel-operating shaft only when the speed of the engine exceeds a speed which corresponds to the power range of that engine as controlled by said first engine-regulated carburetor.

11. In combination with a wheeled vehicle having a wheel-operating shaft, and having accessories, a first engine and means by which it can drive the wheel shaft, said first engine having a carburetor for fueling it through its full power range, a second engine and means by which it can drive the wheel shaft, means by which the second engine can drive the accessories independently of the drive of the wheel shaft, said second engine having a first carburetor engine-regulated for fueling the engine only through a predetermined lower power range and having a second carburetor for fueling the engine only through a power range above the fueling range of the first carburetor, means for controlling the carburetor of the first engine and the second carburetor of the second engine, said second engine having automatically operable means for causing transmission of power from it to said first shaft only when the speed of the second engine exceeds a speed which corresponds to the power range of that engine as controlled by said first engine-regulated carburetor.

12. A device of the class described comprising, first and second shafts, a first engine and means by which it can drive the first shaft, said engine having a carburetor for fueling it through its full power range, a second engine and means by which it can drive the first shaft, means by which the second engine can drive the second shaft independently of the drive of the first shaft, said second engine having a first carburetor engine-regulated for fueling the engine only through a predetermined lower power range and having a second carburetor for fueling the engine only through a power range above the fueling range of the first carburetor, means for controlling the carburetor of the first engine and the second carburetor of the second engine, said second engine having centrifugally operable means for causing transmission of power from it to said first shaft only when the speed of the second engine exceeds a speed which corresponds to the power range of that engine as controlled by said first engine-regulated carburetor.

13. In combination with a wheeled vehicle having a wheel-operating shaft, a first engine and means by which it can drive the shaft, said engine having a carburetor for fueling it through its full power range, a second engine and means by which it can drive the shaft, said second engine having a first carburetor engine-regulated for fueling the engine only through a predetermined lower power range and having a second carburetor for fueling the engine only through a power range above the fueling range of the first carburetor, movable means for controlling the carburetor of the first engine and the second carburetor of the second engine and adapted as it is moved part way from an initial toward a final position to control the carburetor of the first engine to fuel that engine through substantially its full power range and adapted only when said movable means is further advanced toward its final position to cause the second carburetor of the second engine to fuel that engine, said second engine having a centrifugally operable means automatically operable to cause transmission of power from it to said shaft only when the speed of said second engine exceeds a speed which corresponds to the power range of that engine as controlled by said first engine-regulated carburetor.

14. In combination with a wheeled vehicle having a wheel-operating shaft, and having accessories and a driving shaft therefor, a first engine and means by which it can drive the wheel shaft, said engine having a carburetor for fueling it through its full power range, a second engine and means by which it can drive the wheel shaft, means by which the second engine can drive the accessory shaft independently of the drive of the wheel shaft, said second engine having a first carburetor engine-regulated for fueling the engine only through a predetermined lower power range for driving the accessories, and having a second carburetor for operating the engine only through a power range above the fueling range of the first carburetor, movable means for controlling the carburetor of the first engine and the second carburetor of the second engine and adapted as it is moved part way from an initial toward a final position to control the carburetor of the first engine to fuel that engine through substantially its full power range and adapted only when said movable means is further advanced toward its final position to cause the second carburetor of the second engine to fuel that engine, said second engine having a centrifugally operable means automatically operable to cause transmission of power from it to said shaft only when the speed of said second engine exceeds a speed which corresponds to the power range of that engine as controlled by said first engine-regulated carburetor.

15. A device of the class described comprising, a shaft, first and second engines, means by which each engine can independently or together drive the shaft including means associated with the second engine which automatically power-couples that second engine to said shaft when second engine speed reaches some predetermined minimum which is substantially less than its potential speed, a carburetor for each engine, a pedal and means operably connecting the pedal and the carburetors in such manner that pedal depression to a degree less than total depression can operate the carburetor of the first engine to operate the engine through substantially its full speed range and so that continued pedal depression beyond said given degree will cause the carburetor of the second engine to operate that engine at a speed which will cause said automatic power-coupling means to transmit power to the said shaft.

16. In combination, a first shaft having, a first bevel gear, a second shaft having two gears and a clutch adapted to cause either gear to rotate the shaft, two hollow shafts each having, a bevel gear meshing with the first mentioned bevel gear, two engines, means by which each engine can independently drive one of the gears on the second shaft including a shaft which passes through a corresponding hollow shaft, means by which each engine can drive one of the hollow shafts including, a clutch for each engine the clutch of one of the engines being centrifugally operable.

17. A device of the class described comprising, first, second and third shafts, driving connections between the shafts adapting any one to rotate the other two, two automotive engines each having a crank shaft and a flywheel housing, a casing connecting the flywheel housings of the engines, bearings in the casing for the first shaft, said second and third shafts each being rotatably stepped in a bearing of the crank shaft of one of the engines and being stepped at the opposite end in a bearing carried by the casing whereby each shaft can rotate independently of the corresponding crank shaft, and a power transmission clutch for each engine by which the second and third shafts can be selectively powered by the corresponding engine.

18. A wheeled vehicle having, a propeller shaft, means connecting one end of the shaft for driving the wheels of the vehicle, a first bevelled gear fixed to the shaft intermediately of its ends, second and third bevel gears meshing with the first gear at opposite sides of the shaft, a casing enclosing said gears, a first engine at one side of and secured to said casing and having a crank shaft, a first driving sleeve for the second bevel gear held in bearings which are in the crank shaft and on said casing, a first clutch by which a driving connection between sleeve and crank shaft is obtained, a second engine, a second sleeve for driving the third gear held in bearings which are on the crank shaft of the second engine and on said casing, a second clutch by which a driving connection between the second sleeve and the second engine is obtained, an accessory drive shaft on the casing, first and second spur gears loose on said accessory shaft, a clutch adapted to alternately connect said spur gears to said accessory drive shaft, means by which the first engine drives the first spur gear, including a shaft connected to the crank shaft of said first engine and passing through and supported by bearings on said first sleeve, and means by which the second engine drives the second spur gear including a shaft which is connected to the crank shaft of the second engine and passing through and supported by a bearing on the second sleeve.

19. A device of the class described comprising, two engines having the axes of the crank shafts aligned, each engine having a shaft having a gear, a main casing connecting the engines, bearings for said shafts supported by said casing, said shafts being also supported by respective crank shafts, a secondary casing detachably secured to the main casing and having therein gears each of which meshes with one of the aforesaid gears in a manner to be naturally separable from said gears when the secondary casing is moved away from the main casing, an output shaft journaled in the secondary casing and means within the secondary casing for driving said shaft, including shiftable clutches by which said output shaft can be driven by either of the aforesaid gears of the secondary casing.

20. A device of the class described comprising, two engines having the axes of the crank shafts aligned, each engine having a shaft having a gear, a main casing connecting the engines, bearings for said shafts supported by said casing, said shafts being also supported by respective crank shafts, a secondary casing detachably secured to the main casing and having therein secondary gears each of which meshes with one of the aforesaid gears in a manner to be naturally separable from said gears when the secondary casing is moved away from the main casing, an output shaft journaled in the secondary casing, means within the secondary casing for driving said output shaft, including shiftable clutches by which said output shaft can be driven by either of the aforesaid gears of the secondary casing, said means for driving said output shaft also including a shaft for each secondary gear, a bevel gear on said shaft having a hub on which the secondary gear rotates, the said clutches serving to transmittably connect said secondary gears to said bevel gears, and said output shaft having a bevel gear in constant mesh with both bevel gears.

21. A device of the class described comprising, an engine having a first carburetor adapted to independently fuel the engine only through a low speed range, and means by which the carburetor is mechanically engine-governed for that purpose, a second carburetor adapted to independently fuel the engine through a speed range above that of the range fueled by the first carburetor and manually operable mechanical means for controlling said second carburetor, a first shaft driven by the engine, and a second shaft, and mechanical means for automatically causing torque transmission from the engine to said second shaft only when said second carburetor is fueling the engine through said higher speed range.

22. A device of the class described comprising, an engine having a first carburetor adapted to independently fuel the engine only through a low speed range, and means by which the carburetor is mechanically engine-governed to be normally open and to promptly close when the upper limit of low speed range is reached, a second carburetor adapted to independently fuel the engine through a speed range above that of the range fueled by the first carburetor and manually operable mechanical means for controlling said second carburetor, a first shaft driven by the engine, and a second shaft, and mechanical means for automatically causing torque transmission from the engine to said second shaft only when said second carburetor is fueling the engine through said higher speed range.

23. A device of the class described comprising, first engine having a first carburetor adapted to independently fuel the engine only through a low speed range, and means by which the carburetor is mechanically engine-governed for that purpose, a second carburetor adapted to independently fuel the engine through a speed range above that of the range fueled by the first carburetor, a first shaft driven by the first engine, and a second shaft, and mechanical means for automatically causing torque transmission from the engine to said second shaft only when said second carburetor is fueling the engine, a second engine and means by which it transmits torque to the second shaft, said second engine having a third carburetor for fueling it throughout its full speed range, and manually operable mechanical control so interconnecting the second and third carburetors that on operation of said means the third carburetor will be operated through the greater part of its fueling range, and then the second carburetor will be brought into action, and so that thereafter both carburetors will be operated simultaneously to the limits of their fueling capacities.

24. A device of the class described comprising a wheeled vehicle having accessories, a first engine having a first carburetor adapted to independently fuel the engine only through a low speed range, and means by which the carburetor is mechanically engine-governed for that purpose, a second carburetor adapted to independently fuel the engine through a speed range above that of the range fuelled by the first carburetor, a first shaft driven by the first engine, and means by which it drives the accessories, and a second shaft adapted to drive the vehicle wheels, and mechanical means for automatically causing torque transmission from the engine to said second shaft only when said second carburetor is fuelling the engine, a second engine and means by which it transmits torque to the second shaft, said second engine having a third carburetor for fuelling it throughout its full speed range, and manually operable mechanical control means so interconnecting the second and third carburetors that on operation of said means the third carburetor will be operated through the greater part of its fueling range, and then the second carburetor will be brought into action, and so that thereafter both carburetors will be operated simultaneously to the limits of their fueling capacities.

25. A device of the class described comprising, an engine, having two carburetors, the first one automatically engine-regulated and adapted to fuel the engine only for lower speeds and lower power output demands, and the second manually controlled and adapted to fuel the engine only for higher speeds and higher power output demands, the arrangement being such the first carburetor is rendered inoperative for fueling action, when engine speed is increased by manual fueling operation of the second carburetor.

26. A device of the class described comprising a wheeled vehicle having a propeller shaft, first and second engines and means by which either engine separately or both engines simultaneously can drive that shaft, including a unit clutch mechanism adapted to permit independent operation of the second engine below a predetermined speed without driving the propeller or being driven by said propeller, and which is adapted to act automatically to drive said propeller when second engine speed is raised above said predetermined speed, a second shaft and means by which either engine can drive it separately and independently of any action by said clutch mechanism, said first engine having an all speed carburetor and said second engine having an engine-regulated carburetor for operating the engine only at a predetermined low speed and having a second carburetor for operating it at speeds above said predetermined low speed, and manual means for so controlling the carburetor of the first engine and said second carburetor of said second engine as to cause the said second carburetor of the second engine to assume entire control of the second engine when the carburetor of the first engine is operating near its peak capacity, to thereby raise the speed of the second engine to cause the second engine to automatically transmit power to said propeller shaft.

27. A device of the class described, comprising a wheeled vehicle having first and second engines each having a valved carburetor, plural means by which each engine alone or both together can power the vehicle wheels through a common shaft, a carburetor control element, and means connecting said control element with the valves of the carburetors so that as the control element moves in one direction the valve of the carburetor of the first engine will be opened through a large part of its total power range before the carburetor valve of the second engine is opened, and thereafter both valves will continue to open in unison to their limits.

28. In an automotive vehicle, having a propeller shaft, first and second engines and means by which each can drive said propeller shaft, each means including a hollow shaft as a first shaft and a second shaft passing through said first shaft and driven by the crankshaft, centrifugally controlled means for power-coupling the second engine to its first shaft only when second engine speed exceeds some predetermined maximum which is less than its total speed, means for power-coupling the first engine to its first shaft, a third shaft, gear means for each engine by which its second shaft can drive said third shaft, and clutch means for the third shaft for alternately establishing driving connection between it and the gear means of either engine.

29. In an automotive vehicle having accessories and a main drive shaft for propelling the vehicle, the combination comprising, a main engine and an auxiliary engine, an accessory shaft for powering the accessories, first clutch means for selectively and independently establishing driving connection between either of said engines and said accessory shaft whereby either of said engines will independently drive said accessories, second clutch means for establishing driving connection between said main engine and said main drive shaft to propel the vehicle, automatic speed governing means responsive to the speed of said auxiliary engine for normally maintaining the speed of said auxiliary engine at a predetermined speed, manually controlled carburator means on said auxiliary engine for increasing the speed thereof above said predetermined speed, and third clutch means between said auxiliary engine and said main drive shaft operative to establish driving connection therebetween only when the speed of said auxiliary engine is in excess of said predetermined speed.

30. In an automotive vehicle having accessories and a drive shaft for propelling the vehicle, the combination comprising, a main engine and an auxiliary engine, means including a clutch mechanism by which said main engine can drive said drive shaft and thereby propel said vehicle, means by which said auxiliary engine can constantly drive the accessories, automatic speed governing means for normally maintaining the speed of said auxiliary engine at a predetermined speed, manually controlled carburetor means on said auxiliary engine for increasing the speed thereof above said predetermined speed, and clutch means between said auxiliary engine and said drive shaft automatically operative to establish driving connection therebetween only when the speed of said auxiliary engine is in excess of said predetermined speed.

References Cited in the file of this patent

UNITED STATES PATENTS

| Number | Name | Date |
|---|---|---|
| 1,288,679 | Reichenbach | Dec. 24, 1918 |
| 1,768,530 | Short | June 24, 1930 |
| 1,826,675 | Roberts | Oct. 6, 1931 |
| 1,868,130 | Bauer et al. | July 19, 1932 |
| 1,944,256 | Miller et al. | Jan. 23, 1934 |
| 1,978,172 | Sinclair | Oct. 23, 1934 |
| 2,000,709 | Matthews | May 7, 1935 |
| 2,078,262 | McGrew | Apr. 27, 1937 |
| 2,082,129 | Van Ranst | June 1, 1937 |
| 2,140,687 | Brown | Dec. 20, 1938 |
| 2,169,334 | Zerk et al. | Aug. 15, 1939 |
| 2,190,534 | Nyffenegger | Feb. 13, 1940 |
| 2,212,465 | Baldwin | Aug. 20, 1940 |
| 2,267,066 | Wolf | Dec. 23, 1941 |
| 2,287,130 | Ramey | June 23, 1942 |
| 2,318,726 | Wagner | May 11, 1943 |
| 2,377,457 | Stalker | June 5, 1945 |
| 2,419,811 | Beall | Apr. 29, 1947 |
| 2,427,863 | Lauver et al. | Sept. 23, 1947 |
| 2,448,662 | Dale | Sept. 7, 1948 |
| 2,454,293 | Waseige | Nov. 23, 1948 |

FOREIGN PATENTS

| Number | Country | Date |
|---|---|---|
| 443,550 | Great Britain | May 25, 1934 |

Dedication 2,689,013.—*Milo M. Dean*, Palatine, and *Nils A. Thunstrom*, Chicago, Ill. CONTROL FOR TWO-ENGINE VEHICLES. Patent dated Sept. 14, 1954. Dedication filed Aug. 22, 1957, by the assignee, *The Greyhound Corporation*.

Hereby dedicates to the public the unexpired term of said patent.
[*Official Gazette October 1, 1957.*]